US012700965B2

(12) United States Patent
Frenne et al.

(10) Patent No.: US 12,700,965 B2
(45) Date of Patent: Aug. 4, 2026

(54) COLLIDING APERIODIC SOUNDING REFERENCE SIGNAL RESOURCE SETS

(71) Applicant: Telefonaktiebolaget LM Ericsson (PUBL), Stockholm (SE)

(72) Inventors: Mattias Frenne, Uppsala (SE); Andreas Nilsson, Gothenburg (SE); Sven Jacobsson, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 266 days.

(21) Appl. No.: 18/553,880

(22) PCT Filed: Apr. 6, 2022

(86) PCT No.: PCT/IB2022/053221
§ 371 (c)(1),
(2) Date: Oct. 4, 2023

(87) PCT Pub. No.: WO2022/214999
PCT Pub. Date: Oct. 13, 2022

(65) Prior Publication Data
US 2024/0187174 A1 Jun. 6, 2024

Related U.S. Application Data

(60) Provisional application No. 63/171,144, filed on Apr. 6, 2021.

(51) Int. Cl.
*H04L 5/00* (2006.01)
(52) U.S. Cl.
CPC .......... *H04L 5/0048* (2013.01); *H04L 5/0053* (2013.01); *H04L 5/0064* (2013.01)

(58) Field of Classification Search
CPC .... H04L 5/0048; H04L 5/0064; H04L 5/0053
See application file for complete search history.

(56) References Cited

U.S. PATENT DOCUMENTS

| | | | | |
|---|---|---|---|---|
| 11,424,883 B2 * | 8/2022 | Park | | H04W 72/56 |
| 2018/0324788 A1 * | 11/2018 | Choi | | H04L 5/1469 |

(Continued)

FOREIGN PATENT DOCUMENTS

| | | | | | |
|---|---|---|---|---|---|
| CN | 116548008 A | * | 8/2023 | ........ | H04W 72/0446 |
| EP | 3754885 A1 | | 12/2020 | | |
| WO | WO2020039334 A1 | | 2/2020 | | |

OTHER PUBLICATIONS

Wang et al., "Delay Of Non-periodic Sounding Reference Signals", Aug. 4, 2023, Qualcomm Inc (California, US), 34 pages. (Year: 2023).*

(Continued)

*Primary Examiner* — Brian J. Gillis
*Assistant Examiner* — Chhian (Amy) Ling
(74) *Attorney, Agent, or Firm* — Sonoda & Kobayashi Intellectual Property Law; Sarvajit S. Patil

(57) ABSTRACT

According to some embodiments, a method performed by a wireless device for transmitting a sounding reference signal (SRS) comprises: receiving a SRS configuration for two or more SRS resource sets; determine a first SRS resource set of the two or more SRS resource sets collides with a second SRS resource set of the two or more SRS resource sets; determining not to transmit SRS using the first SRS resource set; and transmitting SRS using the second SRS resource set.

23 Claims, 22 Drawing Sheets

(56) References Cited

U.S. PATENT DOCUMENTS

| | | | |
|---|---|---|---|
| 2020/0374814 A1* | 11/2020 | Gong | .................... H04L 5/0023 |
| 2020/0403749 A1 | 12/2020 | Park et al. | |
| 2022/0014328 A1* | 1/2022 | Sakhnini | .......... H04W 56/0045 |
| 2022/0337373 A1* | 10/2022 | Wu | ....................... H04L 5/0048 |

OTHER PUBLICATIONS

3GPP TSG RAN WG1 Meeting #94; Gothenburg, Sweden, Aug. 20-24, 2018; Source: CMCC; Title: Discussion on remaining issues on SRS; Agenda Item: 7.1.2.4 (R1-1808831).
3GPP TSG RAN WG1 Meeting #104-e; e-Meeting, Jan. 25-Feb. 5, 2021; Source: Intel Corporation; Title: Discussion on SRS enhancements; Agenda item: 8.1.3 (R1-2100641).
3GPP TSG RAN WG1 Meeting #94bis; Chengdu, China, Oct. 8-12, 2018; Agenda Item: 7.1.2.4; Source: Sony; Title: Summary of SRS (R1-1811808).
PCT Notification of Transmittal of the International Search Report and the Written Opinion of the International Searching Authority, or the Declaration issued for International application No. PCT/IB2022/053221—Jun. 22, 2022.

* cited by examiner

1500

1512 – receive a SRS configuration for two or more SRS resource sets

1514 – determine a first SRS resource set of the two or more SRS resource sets collides with a second SRS resource set of the two or more SRS resource sets 1516 – determine not to transmit SRS using the first SRS resource set 1518 – transmit SRS using the second SRS resource set

1600

1612 – transmit a SRS configuration for two or more SRS resource sets to a wireless device 1614 – determine a first SRS resource set of the two or more SRS resource sets collides with a second SRS resource set of the two or more SRS resource sets 1616 – determine the wireless device will not transmit SRS using the first SRS resource set 1618 – receive SRS in the second SRS resource set 710 Host computer provides user data 720 Host computer initiates transmission carrying the user data to the UE 730 UE receives the user data 611 Host computer executes client application 610 Host computer provides user data 620 Host computer initiates transmission carrying the user data to the UE 630 Base station transmits the user data 640 UE executes client application

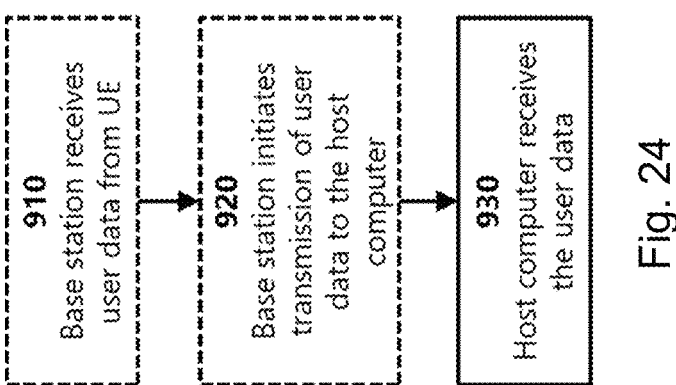

910
Base station receives user data from UE

920
Base station initiates transmission of user data to the host computer

930
Host computer receives the user data

Fig. 24

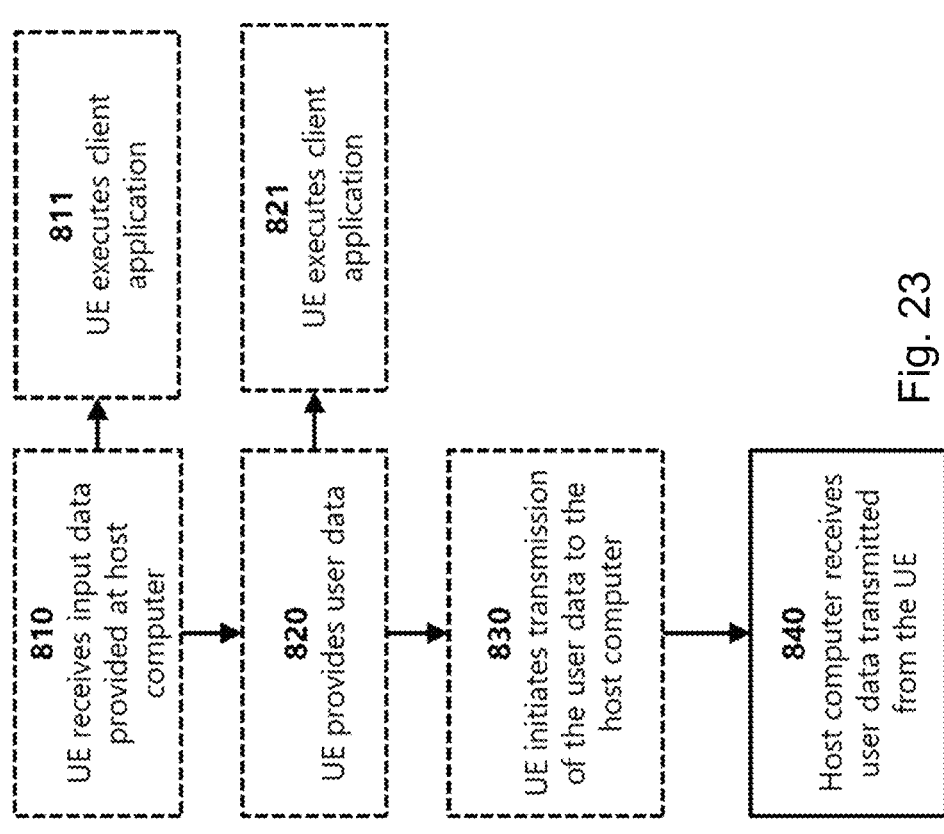

811
UE executes client application

821
UE executes client application

810
UE receives input data provided at host computer

820
UE provides user data

830
UE initiates transmission of the user data to the host computer

840
Host computer receives user data transmitted from the UE

Fig. 23

COLLIDING APERIODIC SOUNDING REFERENCE SIGNAL RESOURCE SETS

PRIORITY

This nonprovisional application is a U.S. National Stage Filing under 35 U.S.C. § 371 of International Patent Application Serial No. PCT/IB2022/053221 filed Apr. 6, 2022 and entitled "COLLIDING APERIODIC SOUNDING REFERENCE SIGNAL RESOURCE SETS" which claims priority to U.S. Provisional Patent Application No. 63/171,144 filed Apr. 6, 2021, both of which are hereby incorporated by reference in their entirety.

TECHNICAL FIELD

Embodiments of the present disclosure are directed to wireless communications and, more particularly, to colliding aperiodic sounding reference signal (SRS) resource sets.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) long term evolution (LTE) and new radio (NR) wireless networks use a sounding reference signal (SRS) to estimate the channel in the uplink (UL). The SRS provides a reference signal to evaluate the channel quality to, e.g., derive the appropriate transmission/reception beams or to perform link adaptation (i.e., setting the rank, the modulation and coding scheme (MCS), and the multiple-input multiple-output (MIMO) precoder) for physical uplink shared channel (PUSCH) transmission. The signal is functionally similar to the downlink (DL) channel-state information reference signal (CSI-RS), which provides similar beam management and link adaptation functions in the downlink. SRS can be used instead of (or in combination with) CSI-RS to acquire downlink CSI (by means of uplink-downlink channel reciprocity) for enabling physical downlink shared channel (PDSCH) link adaptation.

In LTE and NR, the SRS is configured via radio resource control (RRC) and some parts of the configuration can be updated (for reduced latency) by medium access control (MAC) control element (CE) signaling. The configuration includes the SRS resource allocation (the physical mapping and sequence to use) as well as the time (aperiodic/semi-persistent/periodic) behavior. For aperiodic SRS transmission, the RRC configuration does not activate an SRS transmission from the user equipment (UE), but instead a dynamic activation trigger is transmitted via the physical downlink control channel (PDCCH)'s downlink control information (DCI) in the downlink from the gNodeB (gNB) to instruct the UE to transmit the SRS once, at a predetermined time.

The SRS configuration includes an SRS transmission pattern based on an SRS resource configuration grouped into SRS resource sets. Each SRS resource is configured with the following abstract syntax notation (ASN) code in RRC (see 3GPP 38.331 version 16.1.0).

```
SRS-Resource ::=                    SEQUENCE {
    srs-ResourceId                      SRS-ResourceId,
    nrofSRS-Ports                       ENUMERATED {port1, ports2, ports4},
    ptrs-PortIndex                      ENUMERATED {n0, n1 }
    OPTIONAL,   -- Need R
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
            cyclicShift-n4                      INTEGER (0..11)
        }
    },
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
    freqDomainPosition                  INTEGER (0..67),
    freqDomainShift                     INTEGER (0..268),
    freqHopping                         SEQUENCE {
        c-SRS                               INTEGER (0..63),
        b-SRS                               INTEGER (0..3),
        b-hop                               INTEGER (0..3)
    },
    groupOrSequenceHopping              ENUMERATED { neither, groupHopping,
    sequenceHopping },
    resourceType                        CHOICE {
        aperiodic                           SEQUENCE {
            ...
    },
```

-continued

```
    semi-persistent                SEQUENCE {
        periodicityAndOffset-sp         SRS-PeriodicityAndOffset,
        ...
    },
    periodic                       SEQUENCE {
        periodicityAndOffset-p          SRS-PeriodicityAndOffset,
        ...
    }
    },
    sequenceId                     INTEGER (0..1023),
    spatialRelationInfo            SRS-SpatialRelationInfo
OPTIONAL,   -- Need R ...,
    [[
    resourceMapping-r16            SEQUENCE {
        startPosition-r16              INTEGER (0..13),
        nrofSymbols-r16                ENUMERATED {n1, n2, n4},
        repetitionFactor-r16           ENUMERATED {n1, n2, n4}
    }
OPTIONAL    -- Need R
    ]]
}
```

To create the SRS resource on the time-frequency grid with the current RRC configuration, each SRS resource is thus configurable with respect to transmission comb, time domain, and frequency domain.

The transmission comb (i.e., mapping to every $n^{th}$ subcarrier, where n=2 or n=4) is configured by the RRC parameter transmissionComb. For each SRS resource, a comb offset, configured by the RRC parameter combOffset, is specified (i.e., which of the n combs to use). A cyclic shift, configured by the RRC parameter cyclicShift, that maps the SRS sequence to the assigned comb, is also specified. The cyclic shift increases the number of SRS resources that can be mapped to a comb, but there is a limit on how many cyclic shifts that can be used and that depends on which transmission comb is used.

The time-domain position of an SRS resource within a given slot is configured with the RRC parameter resourceMapping. A time-domain start position for the SRS resource, which is limited to be one of the last 6 symbols in a slot, is configured by the RRC parameter startPosition. A number of orthogonal frequency-division multiplexing (OFDM) symbols for the SRS resource (that can be set to 1, 2 or 4) is configured by the RRC parameter nrofSymbols. A repetition factor (that can be set to 1, 2 or 4) is configured by the RRC parameter repetitionFactor. When this parameter is larger than 1, the same frequency resources are used multiple times across OFDM symbols and is used to improve the coverage because more energy is collected by the receiver. The repetition factor can also be used for beam-management functionality, where the gNB can probe different receive beams for each repetition.

The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol is 4 resource blocks (RBs).

FIG. 1 is a schematic illustration of how an SRS resource is allocated in time and frequency in a given OFDM symbol within a slot. Note that c-SRS controls the maximum sounding bandwidth, which can be smaller than the maximum transmission bandwidth the UE supports. For example, the UE may have capability to transmit over 40 MHz bandwidth, but c-SRS is set to a smaller value corresponding to 5 MHZ, thereby focusing the available transmit power to a narrowband transmission, which improves the SRS coverage.

NR release 16 includes an additional (and optional) RRC parameter referred to as resourceMapping-r16. If resourceMapping-r16 is signaled, the UE shall ignore the RRC parameter resourceMapping. The difference between resourceMapping-r16 and resourceMapping is that the SRS resource (for which the number of OFDM symbols and repetition factor is still limited to 4) can start in any of the 14 OFDM symbols (see FIG. 2) within a slot, configured by the RRC parameter startPosition-r16.

The RRC parameter resourceType configures whether the resource is transmitted as periodic, aperiodic (singe transmission triggered by DCI), or semi persistent (same as periodic but the start and stop of the periodic transmission is controlled by MAC CE signaling instead of RRC signaling). The RRC parameter sequenceId specifies how the SRS sequence is initialized and the RRC parameter spatialRelationInfo configures the spatial relation for the SRS beam with respect to a reference signal (RS) which can be either another SRS, synchronization signal block (SSB) or CSI-RS. Thus, if the SRS has a spatial relation to another SRS, then this SRS should be transmitted with the same beam (i.e., spatial transmit filter) as the indicated SRS.

The SRS resource is configured as part of an SRS resource set. All resources in a resource set share the same resource type. Within a set, the following parameters (common to all resources in the set) are configured in RRC. The associated CSI-RS resource (this configuration is only applicable for non-codebook-based uplink transmission) for each of the possible resource types (aperiodic, periodic and semi persistent). For aperiodic SRS, the associated CSI-RS resource is set by the RRC parameter csi-RS. For periodic and semi-persistent SRS, the associated CSI-RS resource is set by the RRC parameter associatedCSI-RS.

For aperiodic resources, the slot offset is configured by the RRC parameter slotOffset and sets the delay from the PDCCH trigger reception to start of the transmission of the SRS resources (measured in slots).

The configuration includes the resource usage, which is configured by the RRC parameter usage sets the constraints and assumption on the resource properties (see 3GPP 38.214).

The configuration includes power-control RRC parameters alpha, p0, pathlossReferenceRS (indicating the downlink reference signal (RS) that can be used for path-loss estimation), srs-PowerControlAdjustmentStates, and pathlossReferenceRSList-r16 (for NR release 16), which are used for determining the SRS transmit power.

Each SRS resource set is configured with the following ASN code in RRC (see 3GPP 38.331 version 16.1.0):

```
SRS-ResourceSet ::=                            SEQUENCE {
    srs-ResourceSetId                              SRS-ResourceSetId,
    srs-ResourceIdList                             SEQUENCE (SIZE(1..maxNrofSRS-ResourcesPerSet)) OF
SRS-ResourceId                         OPTIONAL, -- Cond Setup
    resourceType                                   CHOICE {
        aperiodic                                      SEQUENCE {
            aperiodicSRS-ResourceTrigger                   INTEGER (1..maxNrofSRS-TriggerStates–1),
            csi-RS                                         NZP-CSI-RS-ResourceId
OPTIONAL, -- Cond NonCodebook
            slotOffset                                     INTEGER (1..32)
OPTIONAL, -- Need S ...,
            [[
            aperiodicSRS-ResourceTriggerList               SEQUENCE (SIZE(1..maxNrofSRS-
TriggerStates–2))
                                                               OF INTEGER (1..maxNrofSRS-
TriggerStates–1) OPTIONAL -- Need M
            ]]
        },
        semi-persistent                                SEQUENCE {
            associatedCSI-RS                               NZP-CSI-RS-ResourceId
OPTIONAL, -- Cond NonCodebook
            ...
        },
        periodic                                       SEQUENCE {
            associatedCSI-RS                               NZP-CSI-RS-ResourceId
OPTIONAL, -- Cond NonCodebook
            ...
        }
    },
    usage                                          ENUMERATED {beamManagement, codebook, nonCodebook,
antennaSwitching},
    alpha                                          Alpha
OPTIONAL, -- Need S
    p0                                             INTEGER (–202..24)
OPTIONAL, -- Cond Setup
    pathlossReferenceRS                            PathlossReferenceRS-Config
OPTIONAL, -- Need M
    srs-PowerControlAdjustmentStates               ENUMERATED { sameAsFci2, separateClosedLoop}
OPTIONAL, -- Need S ...,
    [[
    pathlossReferenceRSList-r16                    SetupRelease { PathlossReferenceRSList-r16}
OPTIONAL   -- Need M
    ]]
}
```

Thus, in terms of resource allocation, the SRS resource set configures usage, power control, aperiodic transmission timing, and CSI-RS resource association. The SRS resource configuration controls the time-and-frequency allocation, the periodicity and offset of each resource, the sequence ID for each resource and the spatial-relation information.

SRS resources may be mapped to antenna ports. SRS resources can be configured with four different usages: 'beamManagement', 'codebook', 'nonCodebook' or 'antennaSwitching'.

SRS resources in an SRS resource set configured with usage 'beamManagement' are mainly applicable for frequency bands above 6 GHz (i.e., for frequency range 2 (FR2)) and the purpose is to enable the UE to evaluate different UE transmit beams for wideband (e.g., analog) beamforming arrays. The UE transmits one SRS resource per wideband beam, and the gNB performs reference signal received power (RSRP) measurement on each of the transmitted SRS resources and in this way determines a suitable UE transmit beam. The gNB can then inform the UE which transmit beam to use by updating the spatial relation for different uplink RSs. It is expected that the gNB will configure the UE with one SRS resource set with usage 'beamManagement' for each analog array (panel) that the UE has.

SRS resources in an SRS resource set configured with usage 'codebook' are used to sound the different UE antennas and let the gNB determine suitable precoders, rank and MCS for PUSCH transmission. How each SRS port is mapped to each UE antenna is, however, up to UE implementation and not known at the gNB side.

SRS resources in an SRS resource set configured with usage 'nonCodebook' are used to sound different potential precoders, autonomously determined by the UE. The UE determines a set of precoder candidates based on reciprocity, transmits one SRS resource per candidate uplink precoder, and the gNB can then, by indicating a subset of these SRS resources, select which precoder(s) the UE should use for PUSCH transmission. One uplink layer will be transmitted per indicated SRS. How the UE maps the SRS resources to the antenna ports is up to UE implementation.

SRS resources in an SRS resource set configured with usage 'antennaSwitching' are used to sound the channel in the uplink so that the gNB can use reciprocity to determine suitable downlink precoders. If the UE has the same number of transmit and receive chains, the UE is expected to transmit one SRS port per UE antenna. The mapping from SRS ports to antenna ports is, however, up to the UE to decide and is transparent to the gNB.

Uplink coverage for SRS is identified as a bottleneck for NR and a limiting factor for downlink reciprocity-based operation. Some measures to improve the coverage of SRS have been adopted in NR, for example repetition of an SRS resource and/or frequency hopping.

Before explaining these two schemes, FIG. 3 illustrates an example of SRS transmission without frequency hopping or repetition. Here, the entire bandwidth (which is configured by the RRC parameters c-SRS and b-hop are sounded in a single OFDM symbol).

One example of frequency hopping is illustrated in FIG. 4, where the illustrated frequency-hopping pattern is set according to Section 6.4 of 3GPP TS 38.211. Here, different parts of the frequency band are sounded in different OFDM symbols, which means that the power spectral density (PSD) for the SRS will improve (by a factor of four compared to the baseline case in FIG. 3) at the cost of more symbols being used for SRS and a shorter SRS sequence length per OFDM symbol.

FIG. 5 illustrates an example of repetition, where one SRS resource is transmitted in four consecutive OFDM symbols (by setting the number of SRS symbols per slot and the repetition factor to four), which will, again, increase the PSD for SRS (by a factor four compared to the baseline case in FIG. 3), again, at the cost of more symbols being used for SRS and decreased SRS (multiplexing) capacity.

Frequency hopping and repetition can be used together and, that for semi-persistent and periodic SRS, the frequency-hopping pattern continues beyond the slot boundary (for aperiodic SRS, on the other hand, all parts of the configured bandwidth are sounded within a slot). To illustrate these two points, FIG. 6 depicts a periodic SRS resource (with periodicity one) over two slots. Here, the frequency-hopping configuration is the same as in FIG. 4, the repetition factor is two, and the number of SRS symbols per slot is four. Note that in this example (and in all the previous examples) all hops belong to the same SRS resource.

SRS capacity (i.e., the number of SRS ports that can be multiplexed onto a limited set of time-and-frequency resources) has also been identified as a bottleneck for NR. Therefore, NR includes schemes to improve the capacity of SRS, which include using transmission comb 2 or 4 (i.e., sounding only every 2nd or 4th subcarrier within the configured bandwidth), and multiplexing several SRS ports onto the same transmission comb by using different cyclic shifts.

SRS has its own uplink power control (PC) scheme in NR, which can be found in Section 7.3 of 3GPP 38.213 and specifies how the UE should split the available output power between two or more SRS ports during one SRS transmit occasion (an SRS transmit occasion is a time window within a slot where SRS transmission is performed).

NR Rel-17 includes enhanced DCI triggering flexibility with the option to indicate dynamically the slot offset for aperiodic SRS in the DCI triggering of SRS resource set(s). The slot offset may be determined based on a parameter, hereinafter referred to as t, that indicates the number of slots between a reference slot (reference slot will either be the slot containing the DCI triggering the SRS or the slot indicated by the legacy slot offset parameter) and the slot where the SRS should be transmitted.

A given aperiodic SRS resource set is transmitted in the (t+1)th available slot counting from a reference slot, where t is indicated from DCI, or RRC (if only one value of t is configured in RRC), and the candidate values of t at least include 0. At least one of the following options may be used for the reference slot: Option 1, the reference slot is the slot with the triggering DCI, or Option 2, the reference slot is the slot indicated by the legacy triggering offset.

Based on only RRC configuration, "available slot" is the slot where there are uplink or flexible symbol(s) for the time-domain location(s) for all the SRS resources in the resource set and satisfying the minimum timing requirement between triggering PDCCH and all the SRS resources in the resource set.

Compared to legacy aperiodic SRS slot offset in NR which counts all slots (i.e., downlink slots, uplink slots, and flexible/special slots), the parameter t only counts the available slots. An "available slot" is a slot where there are uplink or flexible symbol(s) for the time-domain location(s) for all the SRS resources in the resource set and satisfying the UE capability on the minimum timing requirement between triggering PDCCH and all the SRS resources in the resource set from the first symbol carrying the SRS request DCI and the last symbol of the triggered SRS resource set. The UE does not expect to receive slot format indicator (SFI) indication, uplink cancellation indication or dynamic scheduling of downlink channel/signal(s) on flexible symbol(s) that may change the determination of "available slot". Collision handling between the triggered SRS and any other uplink channel/signal is performed after the determination of the available slot. An "available slot" is a flexible slot or uplink slot that contains OFDM symbols that can carry all the time-domain allocations of a triggered SRS resource set (i.e., slots that have sufficiently many uplink symbols to support the SRS symbols configured by resourceMapping or resourceMapping-r16 for all SRS resources in the SRS resource set).

3GPP may also extend the number of antennas for antenna switching to 6 and 8 antennas. For aperiodic antenna switching SRS, configuration of $N \leq N_{max}$ resource sets, where totally K resources are distributed in the N resource sets flexibly based on RRC configuration is supported.

For 1T6R, K=6, $N_{max}$=[4], and each resource has 1 port.
For 1T8R, K=8, $N_{max}$=[4], and each resource has 1 port.
For 2T6R, K=3, $N_{max}$=[3], and each resource has 2 ports.
For 2T8R, K=4, $N_{max}$=[4], and each resource has 2 ports.
For 4T8R, K=2, $N_{max}$=[2], and each resource has 4 ports.
SRS could be transmitted over the last 6 OFDM symbols, or over any OFDM symbols within the slot subject to UE capability.

There currently exist certain challenges. For example, due to the dynamic nature of aperiodic triggering, there are cases when a gNB triggers the UE to transmit multiple SRS resource sets and where different sets have different definitions of an available slot, which may in some cases lead to collisions and ambiguity. It is a problem that the UE behavior is undefined in this case. The gNB does not know which set of resource the UE transmitted, and the power setting of the transmission is undefined. Even more, the UE may not transmit anything if such collision occurs, and gNB may estimate uplink channel on an empty resource, believing that the UE has transmitted SRS. This leads to performance degradation.

Furthermore, problems with colliding SRS resource sets will be further exacerbated in NR Rel-17, because SRS resource sets with usage 'antennaSwitching' will be specified for UEs with up to 8 receive antennas. Furthermore, it will be possible to configure one or multiple SRS resource sets for each UE antenna-switching configuration (e.g., for 2T8R, up to 4 SRS resource sets might be allowed), which increases the risk of ambiguity problems.

In addition, the NR specifications include dynamically changing the TDD slot format using DCI, which presents a risk that a certain RRC-based SRS configuration will work for one TDD slot format but not for another. In this case, the risk of collisions and ambiguity is increased further.

SUMMARY

As described above, certain challenges currently exist with colliding sounding reference signal (SRS) resource sets. Certain aspects of the present disclosure and their embodiments may provide solutions to these or other challenges. Particular embodiments include a priority rule that defines user equipment (UE) behavior for colliding aperiodic SRS resource sets. After the priority rules have been applied, the remaining set(s) or resource(s) is collision free and the UE transmits only those. Different embodiments include different priority rules such as set ID, usage, set size (in orthogonal frequency division multiplexing (OFDM) symbols).

According to some embodiments, a method performed by a wireless device for transmitting a SRS comprises: receiving a SRS configuration for two or more SRS resource sets; determining a first SRS resource set of the two or more SRS resource sets collides with a second SRS resource set of the two or more SRS resource sets; determining not to transmit SRS using the first SRS resource set; and transmitting SRS using the second SRS resource set.

In particular embodiments, determining not to transmit SRS using the first SRS resource set is based on resource set identifiers associated with the first and second SRS resource sets. For example, the method may comprise determining not to transmit SRS using the first SRS resource set when a resource set identifier associated with the first SRS resource set is larger (or smaller) than a resource set identifier associated with the second SRS resource set.

In particular embodiments, determining not to transmit SRS using the first SRS resource set is based on an amount of SRS resources associated with the first and second SRS resource sets. For example, determining not to transmit SRS using the first SRS resource set may comprise determining the first resource set has fewer SRS resources than the second SRS resource set.

In particular embodiments, determining not to transmit SRS using the first SRS resource set is based on usage types associated with the first and second SRS resource sets. The usage types may be prioritized from highest to lowest as follows: 'antennaSwitching', 'codebook', 'nonCodebook', and 'beamManagement'.

In particular embodiments, determining not to transmit SRS using the first SRS resource set comprises determining not to transmit a portion of the first SRS resource set that overlaps with the second SRS resource set and transmitting SRS using a non-overlapping portion of the first SRS resource set.

In particular embodiments, determining the first SRS resource set of the two or more SRS resource sets collides with a second SRS resource set of the two or more SRS resource sets comprises determining a slot format has changed.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node for receiving a SRS comprises: transmitting a SRS configuration for two or more SRS resource sets to a wireless device; determining a first SRS resource set of the two or more SRS resource sets collides with a second SRS resource set of the two or more SRS resource sets; determining the wireless device will not transmit SRS using the first SRS resource set; and receiving SRS in the second SRS resource set.

In particular embodiments, determining the wireless device will not transmit SRS using the first SRS resource set is based on resource set identifiers associated with the first and second SRS resource sets. For example, the method may comprise determining the wireless device will not transmit SRS using the first SRS resource set when a resource set identifier associated with the first SRS resource set is larger than a resource set identifier associated with the second SRS resource set.

In particular embodiments, determining the wireless device will not transmit SRS using the first SRS resource set is based on an amount of SRS resources associated with the first and second SRS resource sets.

In particular embodiments, determining the wireless device will not transmit SRS using the first SRS resource set is based on usage types associated with the first and second SRS resource sets. The usage types may be prioritized from highest to lowest as follows: 'antennaSwitching', 'codebook', 'nonCodebook', and 'beamManagement'.

In particular embodiments, determining the wireless device will not transmit SRS using the first SRS resource set comprises determining the wireless device will not transmit a portion of the first SRS resource set that overlaps with the second SRS resource set and the wireless device will transmit SRS using a non-overlapping portion of the first SRS resource set.

In particular embodiments, determining the first SRS resource set of the two or more SRS resource sets collides with a second SRS resource set of the two or more SRS resource sets comprises determining a slot format has changed.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments include rules for how a UE should behave if two (or more) SRS resource sets collide, which enables a gNB to know which sets are dropped and, thus, can make the correct assumption on how the set is transmitted (e.g., which power-control setting and/or virtualization is used). This improves throughput (e.g., downlink throughput if the set that is not dropped is configured with usage 'antennaSwitching').

Using such a rule, the UE behavior is well-defined in each of the following cases: SRS resource-set collisions due to change of slot format; SRS resource-set collisions due to gNB misconfiguration; and/or SRS resource-set collisions due to gNB intentionally configuring overlapping SRS resource sets to reduce control-signaling overhead. For example, if the alternatives are less attractive (e.g., no SRS triggering at all).

BRIEF DESCRIPTION OF THE DRAWINGS

For a more complete understanding of the disclosed embodiments and their features and advantages, reference is now made to the following description, taken in conjunction with the accompanying drawings, in which:

FIG. 23 is a flowchart illustrating a method implemented in a communication system, according to certain embodiments; and FIG. 24 is a flowchart illustrating a method implemented in a communication system, according to certain embodiments.

DETAILED DESCRIPTION

As described above, certain challenges currently exist with colliding sounding reference signal (SRS) resource sets. Certain aspects of the present disclosure and their embodiments may provide solutions to these or other challenges. Particular embodiments include a priority rule that defines user equipment (UE) behavior for colliding aperiodic SRS resource sets. After the priority rules have been applied, the remaining set(s) or resource(s) is collision free and the UE transmits only those. Different embodiments include different priority rules such as set ID, usage, set size (in orthogonal frequency division multiplexing (OFDM) symbols).

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Some embodiments include one or more priority rules that define UE behavior for colliding SRS resource sets where at least one of the sets are aperiodically triggered. After the priority rule(s) has been applied, the remaining set(s) or resource(s) are collision free and the UE transmits only those. Different embodiments include different priority rules such as set ID, usage, set size (in OFDM symbols).

A first group of embodiments include dropping SRS transmission based on SRS resource set ID. In some embodiments, a priority is based on SRS resource set ID. For two or more colliding SRS resource sets, the SRS resource set with lowest priority is dropped. After the SRS resource set with lowest priority has been dropped, if there are still collisions among the remaining SRS resource sets, the SRS resource set with the lowest priority of the remaining sets is dropped. This is continued until there are no more collisions and the remaining SRS resources are transmitted by the UE.

A lower priority can, for example, be a lower SRS resource set ID, a higher SRS resource set ID, or a configured priority ordering of set IDs. For example, the SRS resource set with the lowest SRS resource set ID (i.e., the smallest value of the field srs-ResourceSetId in RRC configuration) may be dropped.

After the SRS resource with lowest SRS resource set priority has been dropped, if there are still collisions among the remaining SRS resource sets, the SRS resource set with the lowest SRS resource set priority of the remaining sets is dropped. In this way, the gNB can set SRS resource-set priority by means of assigning SRS resource set IDs. An iterative approach to dropping sets is thus used. This is continued until there are no more collisions and the remaining resources shall be transmitted by the UE. One example of these embodiments is illustrated in FIG. 7.

Figure 1:
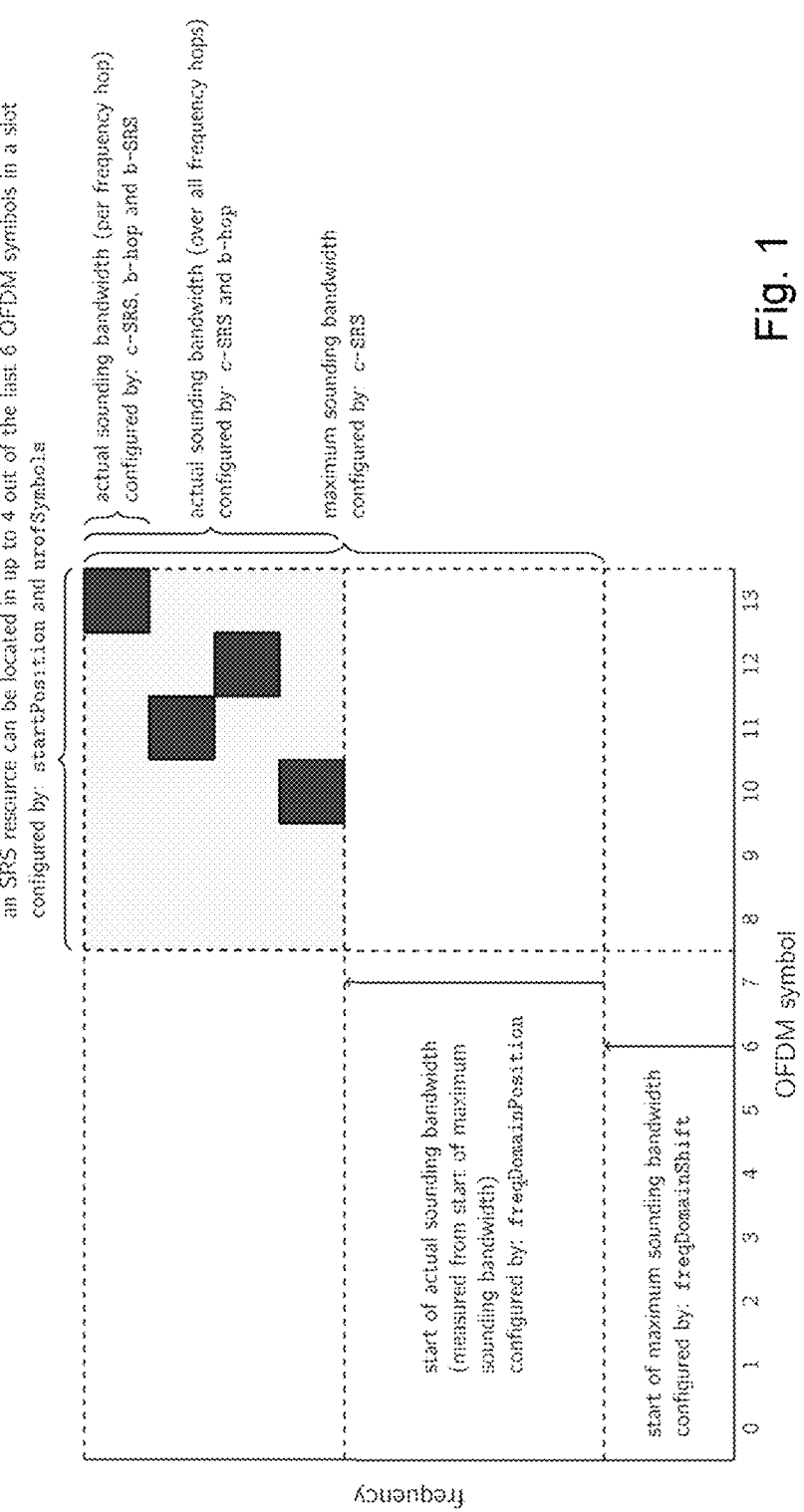
FIG. 1 is a schematic illustration of how an SRS resource is allocated in time and frequency in a given OFDM symbol within a slot.
Figure 2:
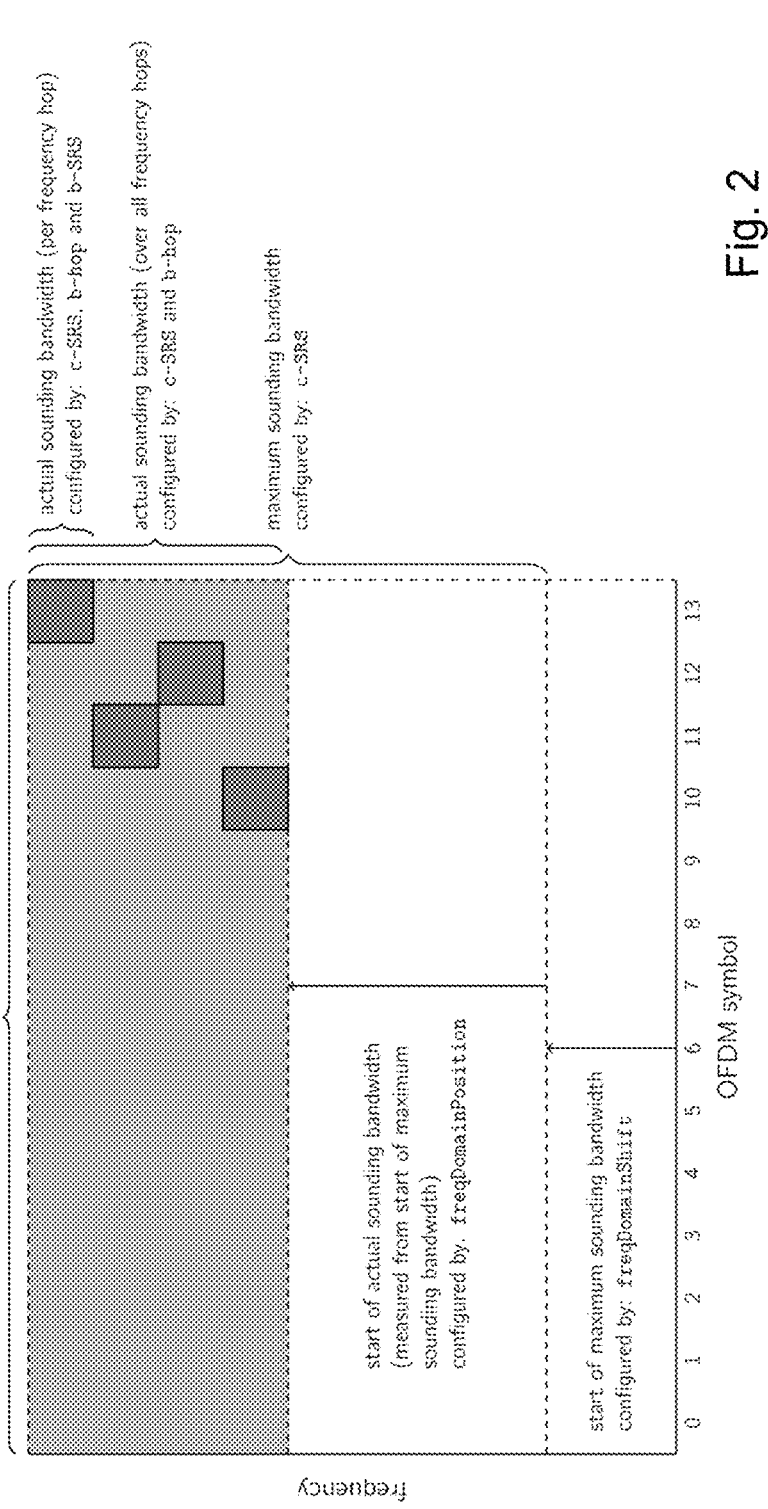
FIG. 2 is a schematic illustration of how an SRS resource is allocated in time and frequency within a slot if resourceMapping-r16 is signaled.
Figure 3:
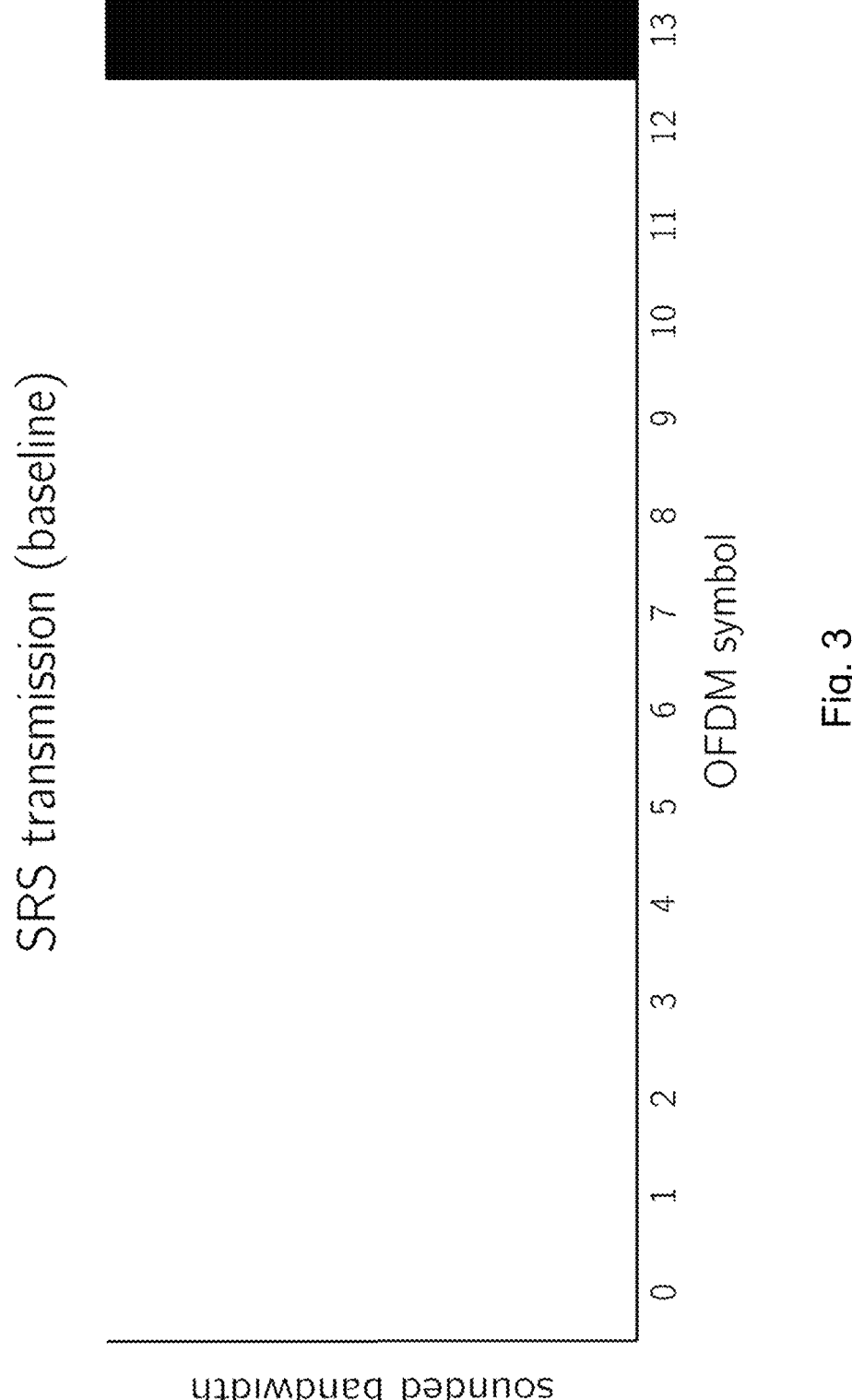
FIG. 3 illustrates an example of SRS transmission without frequency hopping or repetition.
Figure 4:
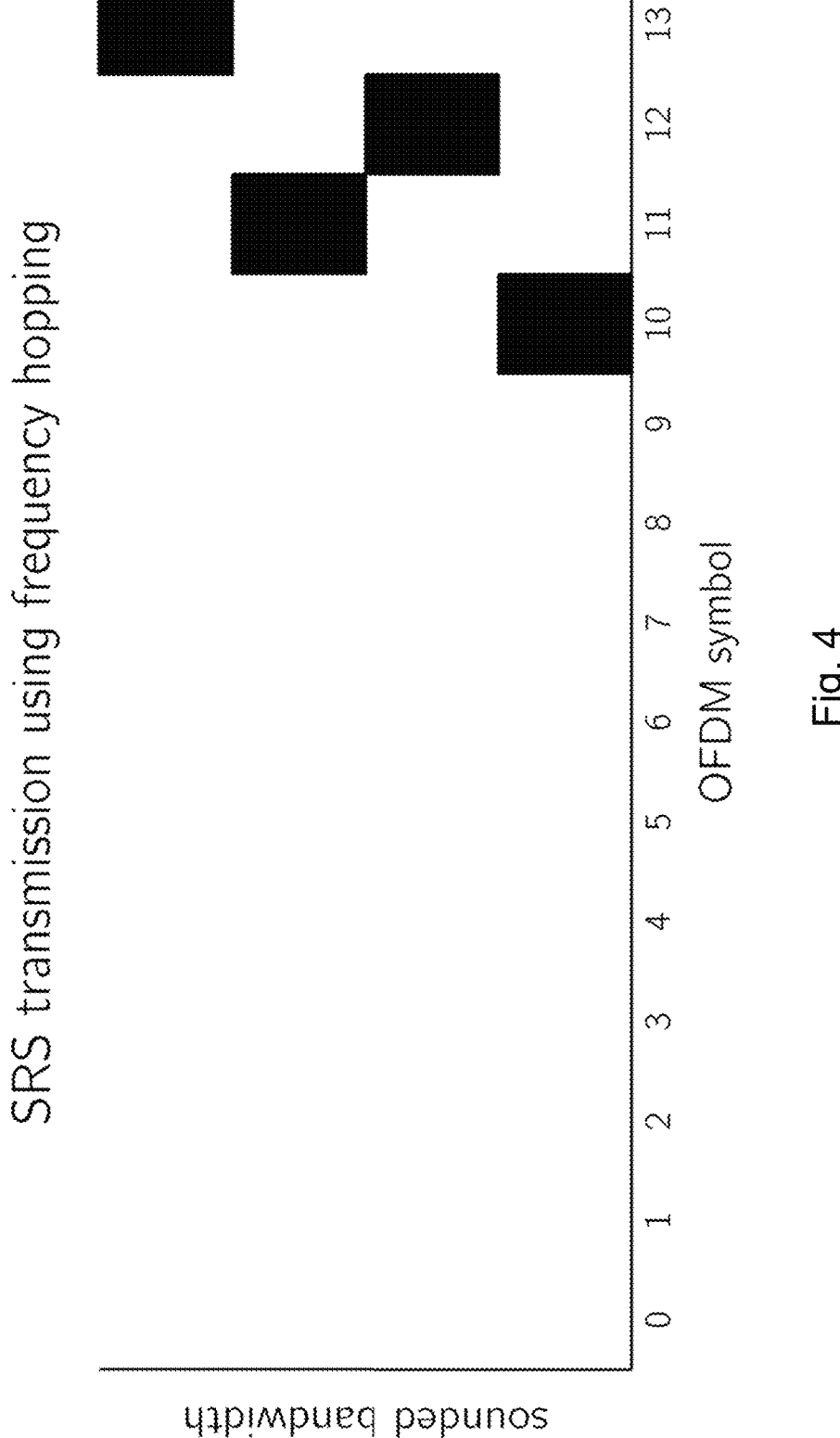
FIG. 4 illustrates SRS transmission using frequency hopping.
Figure 5:
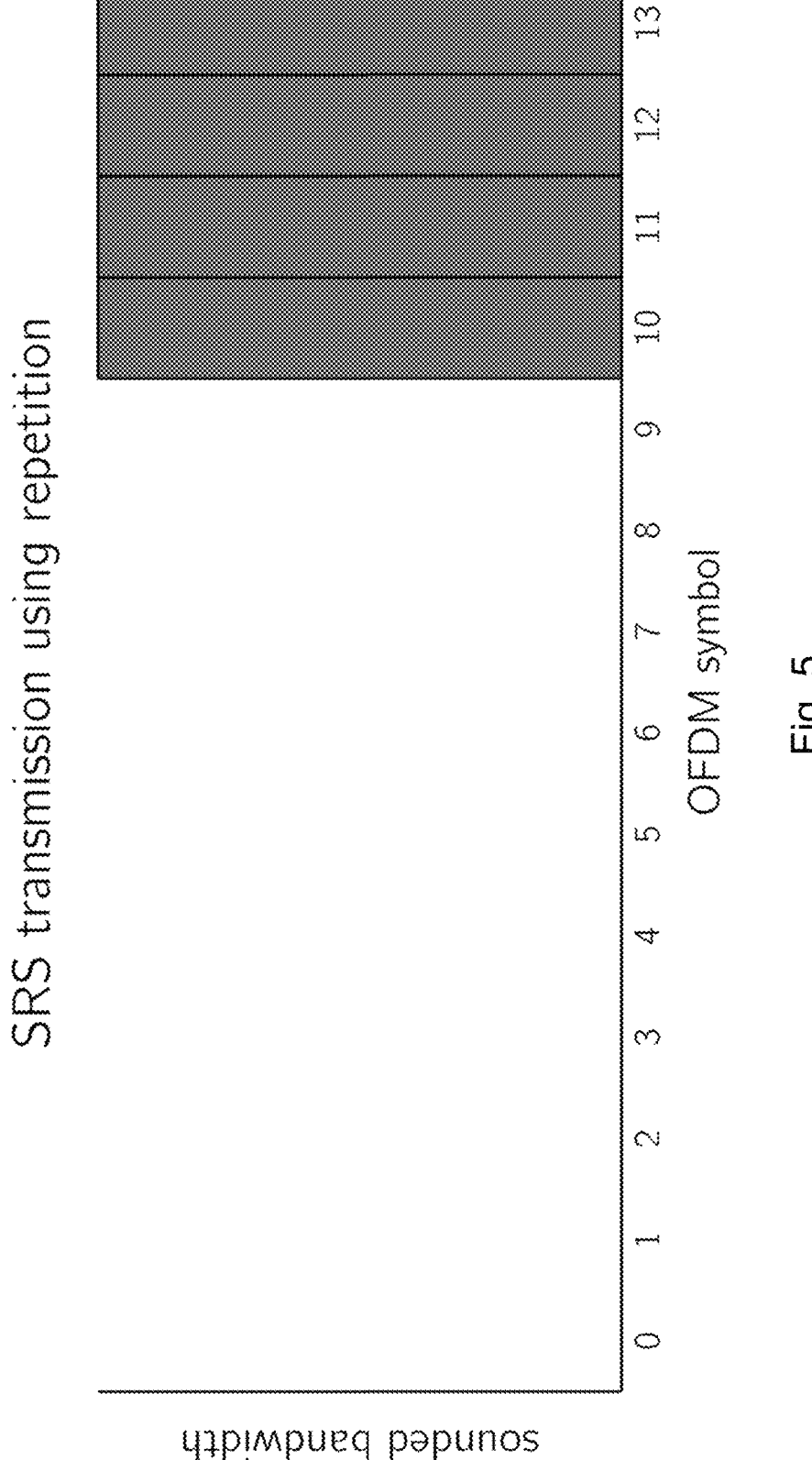
FIG. 5 illustrates SRS transmission using repetition.
Figure 6:
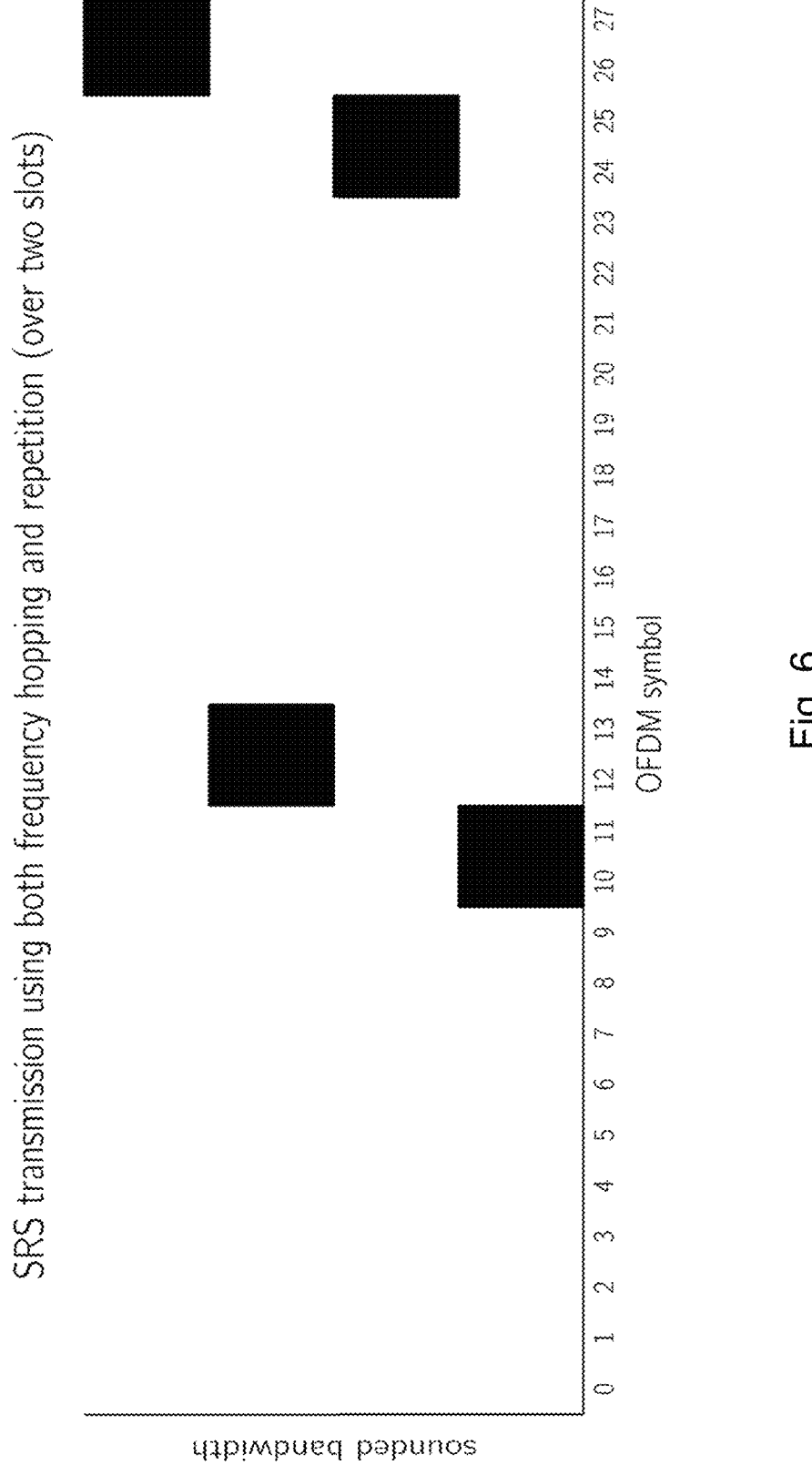
FIG. 6 illustrates SRS transmission using both frequency hopping and repetition.
Figure 7:
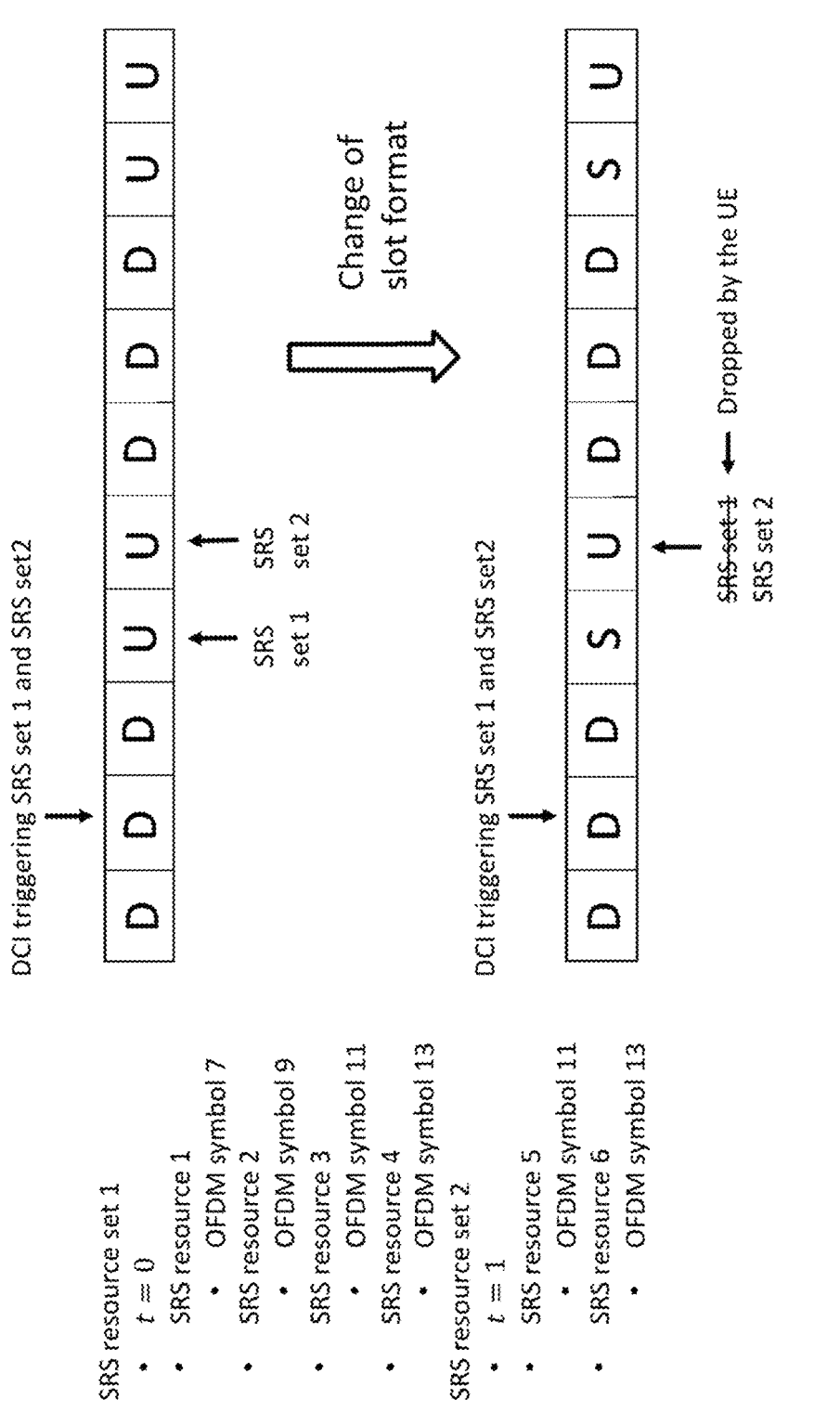
FIG. 7 illustrates dropping of colliding SRS resource sets based on SRS resource-set ID.

FIG. 7 illustrates dropping of colliding SRS resource sets based on SRS resource-set ID. FIG. 7 illustrates a first slot format (upper slot format) and a second slot format after a format change (lower slot format).

After the slot format has changed, the two SRS resource sets contain SRS resources that are overlapping in time (i.e., a collision has occurred) and the UE will not be able to transmit SRS resources from both SRS resource sets.

To resolve the issue, the higher set ID has priority in this embodiment, the SRS resource set with the lowest SRS resource set ID is dropped (i.e., not transmitted by the UE), as shown in FIG. 7.

Figure 8:
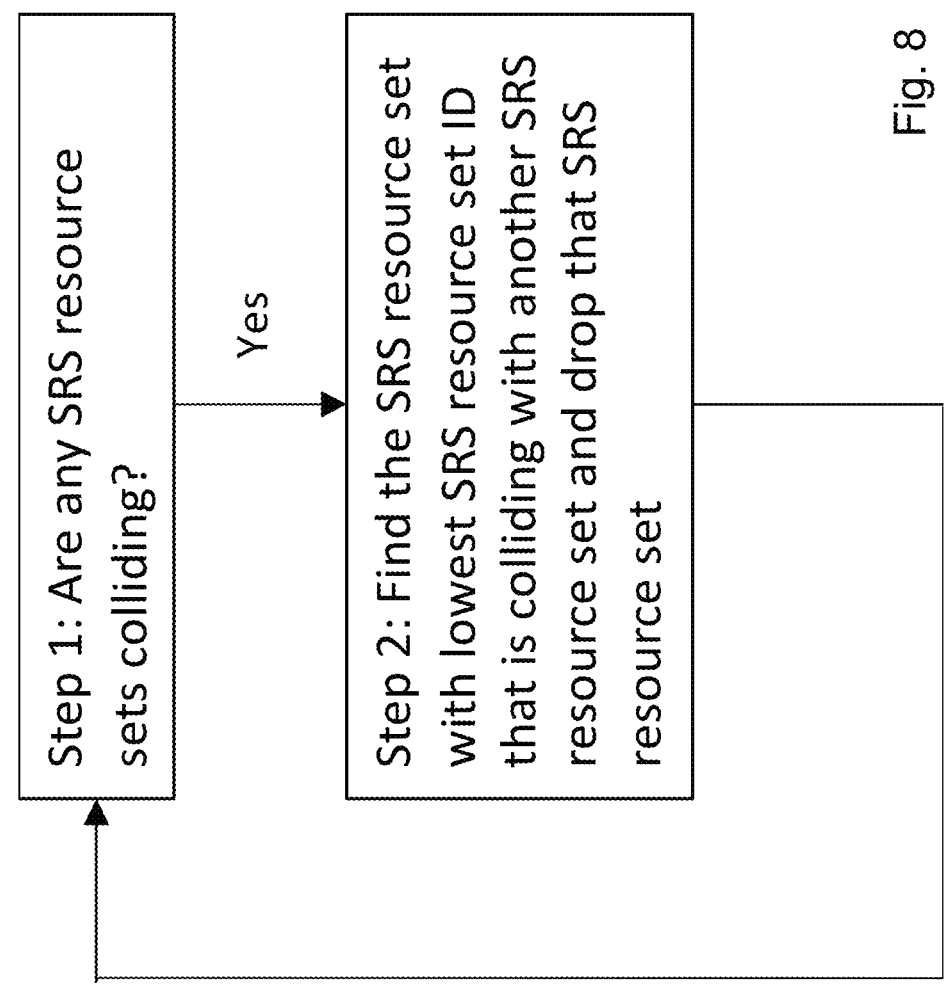
FIG. 8 is a flowchart illustrating particular embodiments where two or more SRS resource sets are colliding.

FIG. 8 is a flowchart illustrating particular embodiments where two or more SRS resource sets are colliding. In Step 1, the UE determines if any SRS resource sets are colliding. If the answer is "Yes" the UE proceeds to Step 2. In Step 2, the UE finds the SRS resource set with lowest SRS resource set ID that contains an SRS resource that is colliding with an SRS resource in another SRS resource set, and then drops that SRS resource set. The UE then returns to Step 1 and repeats the procedure until no more SRS resource sets are colliding.

In some embodiments, instead of dropping SRS resource sets according to lowest SRS resource set ID, the SRS resource set with highest SRS resource set ID is dropped instead.

A second group of embodiments includes dropping based on number of SRS resources in an SRS resource set. In some embodiments, instead of dropping SRS resource set by comparing SRS resource set IDs, the UE determines which of the colliding SRS resource sets has the fewest SRS resources, and drops the SRS resource set in order according to fewest number of SRS resources. For example, assume that SRS resource set 1 and SRS resource set 2 are colliding as in FIG. 7, then the UE drops SRS resource set 2, because that SRS resource set contains fewer SRS resources (two SRS resources, to be precise) than SRS resource set 1 (which contains four SRS resources).

One benefit of these embodiments compared to the first group of embodiments is that the UE will always keep (i.e., transmit) the SRS resource set with most SRS resources, which is typically beneficial because more SRS resources often yields more information about the channel (e.g., for SRS resources configured with usage antenna switching, more SRS resources means that more SRS ports are sounded).

In some embodiments, if two SRS resource sets are colliding with the same number of SRS resources, the SRS resource set with lowest (or highest) SRS resource set ID can be dropped (as in the first group of embodiments).

Figure 9:
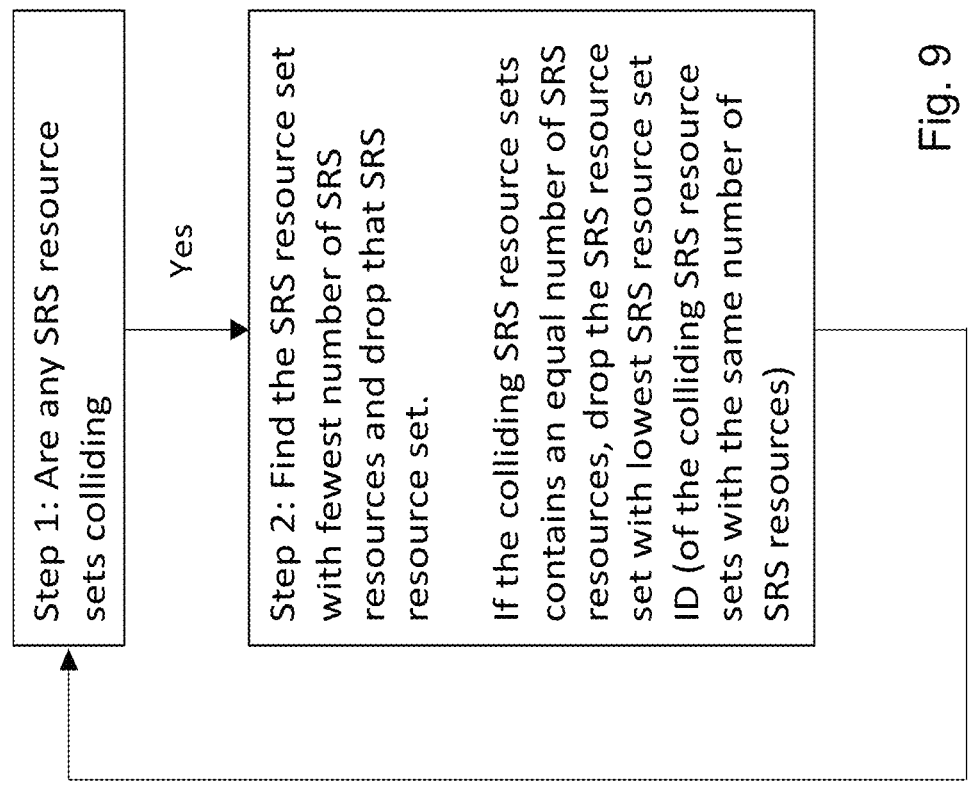
FIG. 9 is another flowchart illustrating particular embodiments where two or more SRS resource sets are colliding.

FIG. 9 is a flowchart illustrating particular embodiments where two or more SRS resource sets are colliding. In Step 1, the UE determines if any SRS resource sets are colliding. If the answer is "Yes", the UE proceeds to Step 2. In Step 2 the UE finds the SRS resource sets with fewest SRS resources that is colliding with another SRS resource set, and then drops that SRS resource set. If the SRS resource set with fewest number of SRS resources is colliding with another SRS resource set with equally many SRS resources, the UE may drop the SRS resource set with, e.g., lowest SRS resource set ID of the colliding SRS resource sets. The UE then returns to Step 1 and repeats the procedure until no more SRS resource sets are colliding.

A third group of embodiments include dropping SRS transmission based on SRS resource-set usage. Each SRS resource set may be configured with a certain usage, as described above. In these embodiments, colliding SRS resource sets are dropped (i.e., prioritized) based on their configured usage. The gNB may configure the set usage to the UE by RRC signaling.

In some embodiments, the priority of the different usages are as follows: (1) ' antennaSwitching'. (2) 'codebook', (3) 'nonCodebook', and (4) 'beamManagement'.

For example, if an SRS resource set with usage 'codebook' collides with an SRS resource set with usage 'antennaSwitching', then the SRS resource set with usage 'codebook' is dropped. This is reasonable because the channel measurements made for usage antenna switching is more time critical than measurements performed for codebook.

In some embodiments, if two SRS resource sets with the same usage are colliding, either the rule in the first or second group of embodiments can be implemented in combination with these embodiments to handle the dropping of colliding SRS resource sets.

If a new usage is introduced that contains dual/multiple of the four legacy usages, e.g. "antennaSwitching and codebook", then in some embodiments, this usage has highest priority of all (i.e., will not be dropped), because it gives the gNB useful information for multiple usages using a single measurement.

A fourth group of embodiments includes dropping a subset of the SRS resources in an SRS resource set. If two (or more) SRS resource sets are only partly overlapping (i.e., only a subset of the SRS resources in an SRS resource set are colliding, it may not be necessary to drop all SRS resources in the SRS resource set). In these embodiments, if two (or more) SRS resource sets are partly overlapping, only the SRS resources from the "dropped SRS resource set" (according, e.g., to any of the rules in previous embodiments of the invention) that are colliding with an SRS resource of another SRS resource set are dropped.

In some embodiments, when such subset dropping is used, the power control is governed by the set that is not dropped (transmitted in its entirety) and the power of the non-dropped set is also applied to the set that is partially dropped. This avoids causing the UE to change the power between transmitting SRS in the first and second set (which have different power control adjustment settings).

Figure 10:
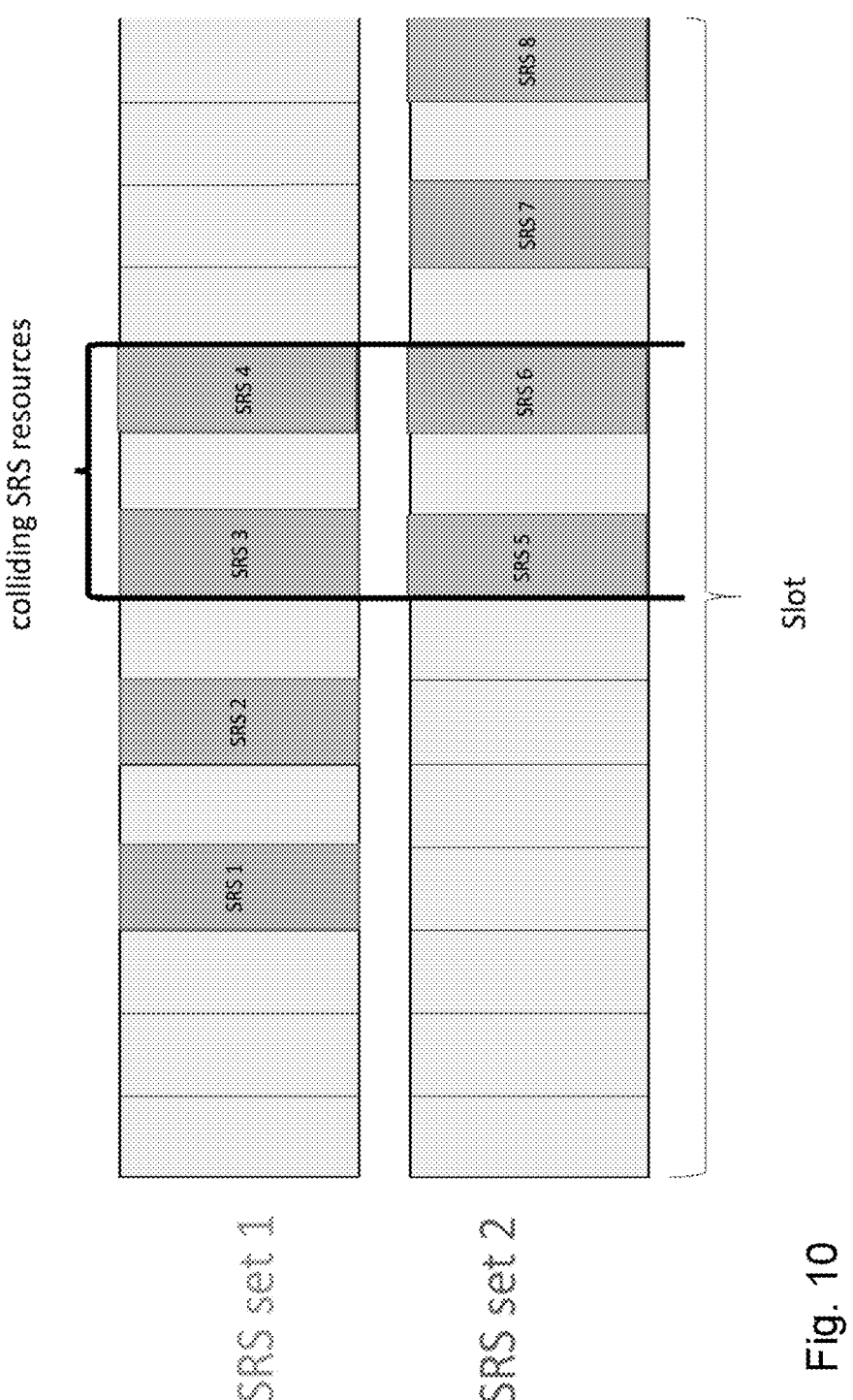
FIG. 10 illustrates colliding SRS resources with partly overlapping SRS resources.

One example of this is illustrated in FIG. 10, where two SRS resource sets are configured with four SRS resources each. As shown in FIG. 10, only SRS resource 3 and 4 from SRS resource set 1 is colliding with SRS resource 5 and 6 from SRS resource set 2, respectively. Assuming that SRS resource set 2 has priority over SRS resource set 1 (e.g., according to any of the rules in the previous embodiments), only SRS resources 3 and 4 are dropped.

Figure 11:
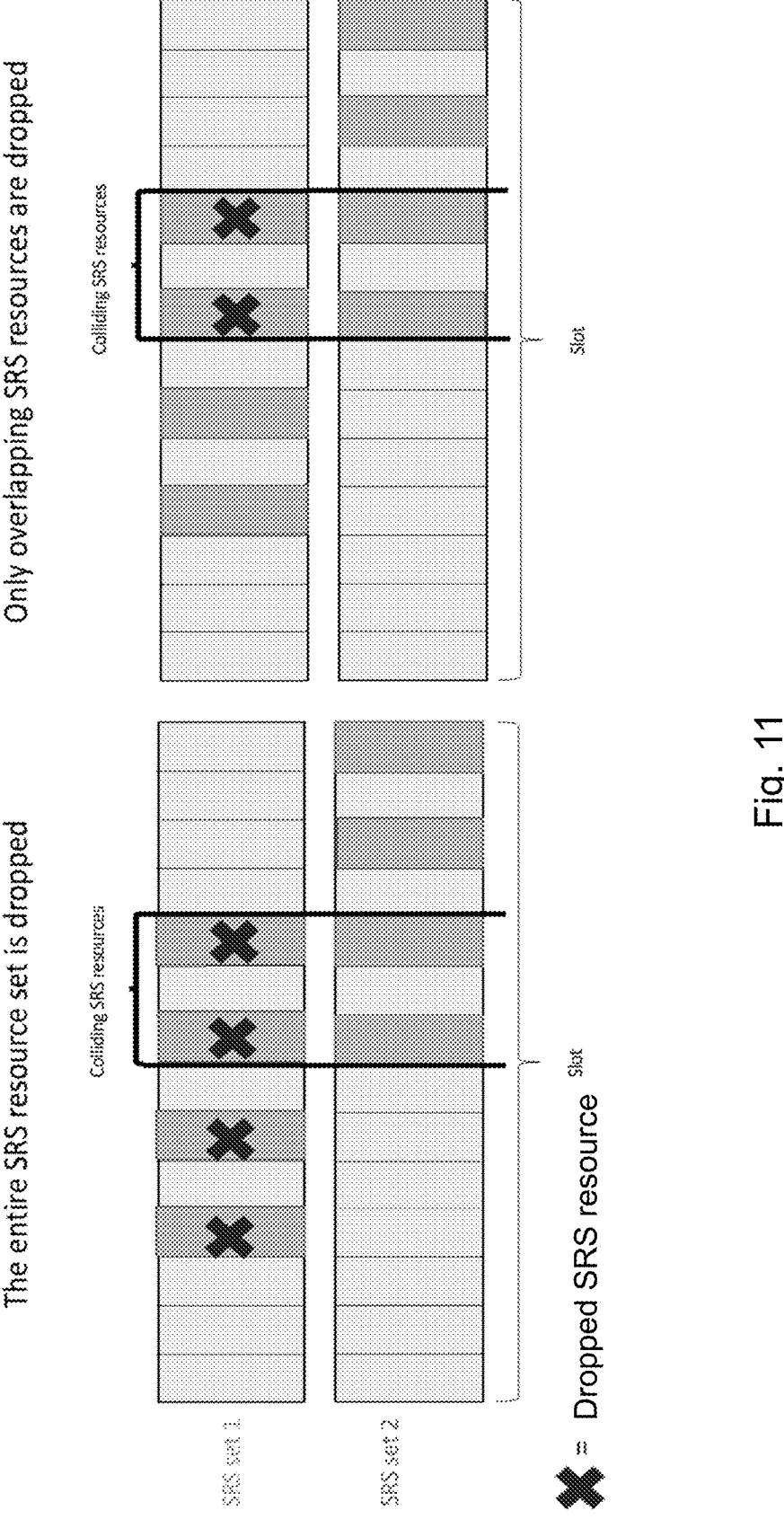
FIG. 11 illustrates a difference between dropping SRS resources in an SRS resource set and dropping the entire SRS resource set.

To further illustrate this point, FIG. 11 compares the behavior according to the first through third group of embodiments (left part of the figure) to the behavior according to the fourth group of embodiments (right part of the figure). By dropping only a subset of the SRS resources in a colliding SRS resource set compared to dropping the entire set, the channel knowledge at the gNB improves at the cost of additional SRS transmissions.

In some embodiments, for multiple-symbol SRS resources (e.g., SRS resources employing repetition or frequency hopping), if any symbol of an SRS resource belonging to the "dropped SRS resource set" collides with another SRS resource, the entire SRS resource may be dropped.

A further use case where a problem occurs is the dynamic slot indication. Because different SRS resource sets can have different time-domain allocations (depending on which SRS resources belong to the SRS resource set), which slots that are counted as "available slots" for SRS transmission from the UE can be different for different SRS resource sets that are triggered simultaneously by the same DCI.

Furthermore, because it is possible in NR to dynamically change the slot format (for example, to adapt the ratio of DL/UL resources to satisfy the current DL/UL traffic demand), a certain SRS resource-set configuration for which no SRS resources (over all the SRS resource sets triggered by the same DCI) are colliding for a first time-division duplex (TDD) slot format, could contain colliding SRS resources for a second slot format, after the slot format has dynamically been changed.

Figure 12:
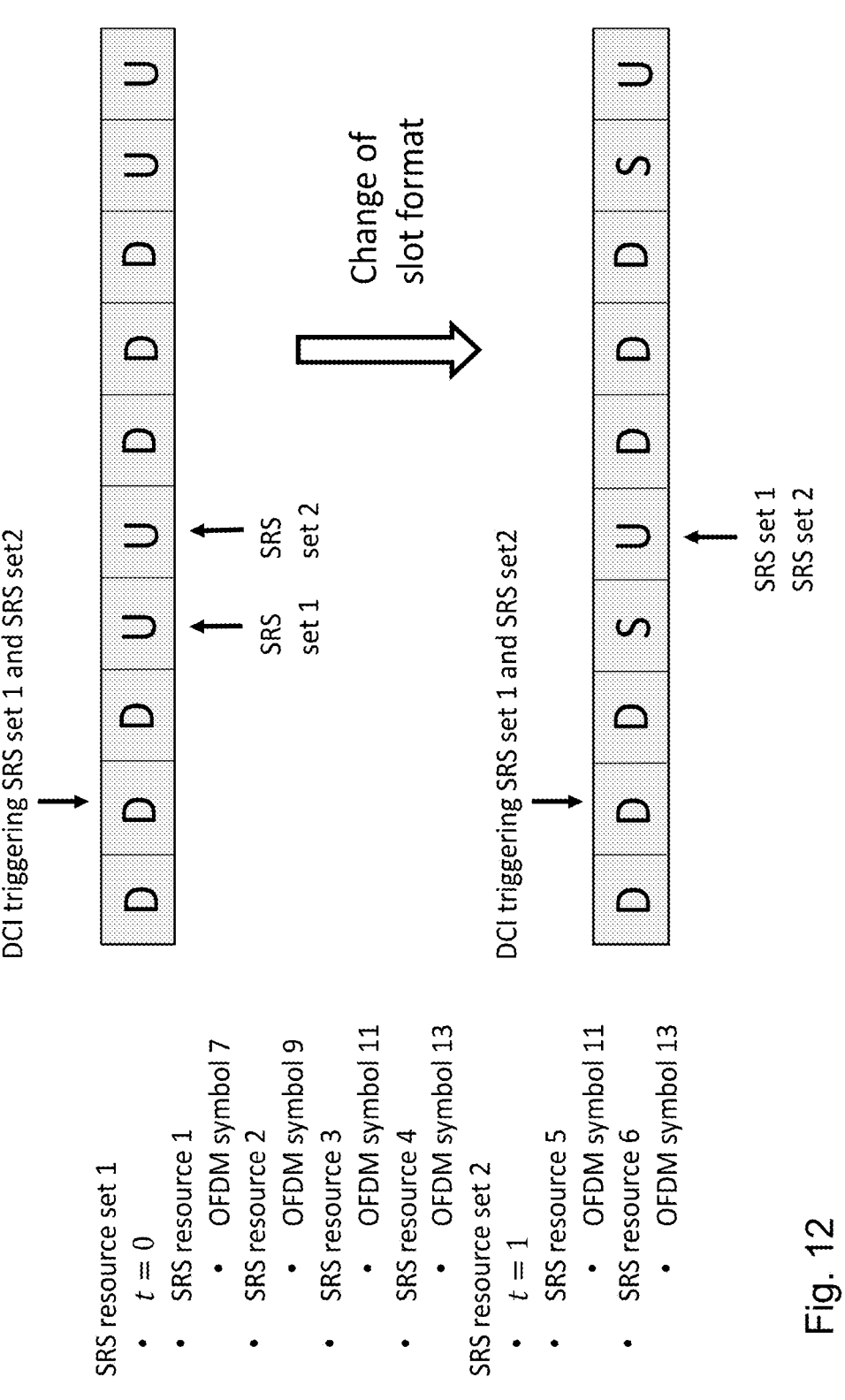
FIG. 12 illustrates an example of how SRS resource sets may collide after a dynamic update of the slot format.

FIG. 12 illustrates an example of how changing the slot format may result in a collision between two SRS resource sets. Here, SRS resource set 1 contains four single-symbol SRS resources and is configured with t=0, and SRS resource set 2 contains two single-symbol SRS resources and is configured with t=1. Consider the case when the two sets have been configured for the TDD slot format "DDD-UUDDDUU".

In this case, all uplink slots are counted as "available slots" because all SRS resources for both SRS resource sets can fit into each of the uplink slots. Thus, the first SRS resource set, for which t=0, will be transmitted in the first "available slot", which corresponds to the first uplink slot after the DCI, while SRS resource set 2, for which t=1, will be transmitted in the second "available slot, which corresponds to the second uplink slot after the DCI, and, thus, there are no collisions between any SRS resources in the two SRS resource sets (see the upper part of FIG. 12).

Assume that the gNB changes the TDD slot format (e.g., to meet new downlink traffic demands) to "DDD-SUDDDSU". Here, S denotes a special slot with 8 downlink symbols (OFDM symbol 0-7), 2 switching symbols (OFDM symbol 8-9), and 4 uplink symbols (OFDM symbol 10-14). Due to the limited number of uplink symbols in the special slot, it is counted as an "available slot" only for SRS resource set 2, because not all SRS resources in SRS resource set 1 can fit in these uplink symbols. Thus, because SRS resource set 1 is configured with t=0 and SRS resource set 2 is configured with t=1, both of these sets will be transmitted in the first uplink slot and, thus, there is a collision between SRS resource sets (see the lower part of FIG. 12). Specifically, there will be a collision between SRS resources 3 and 5, and between SRS resources 4 and 6.

The collision above can be avoided if the gNB, after changing the slot format, instead sends the DCI in the special slot (which results in SRS resource set 1 and 2 being transmitted in the first uplink symbol and the second special symbol, respectively). However, this would defeat the main purpose of the new flexible aperiodic slot offset (i.e., that the gNB can send the DCI in a more flexible way, as described above).

Figure 13:
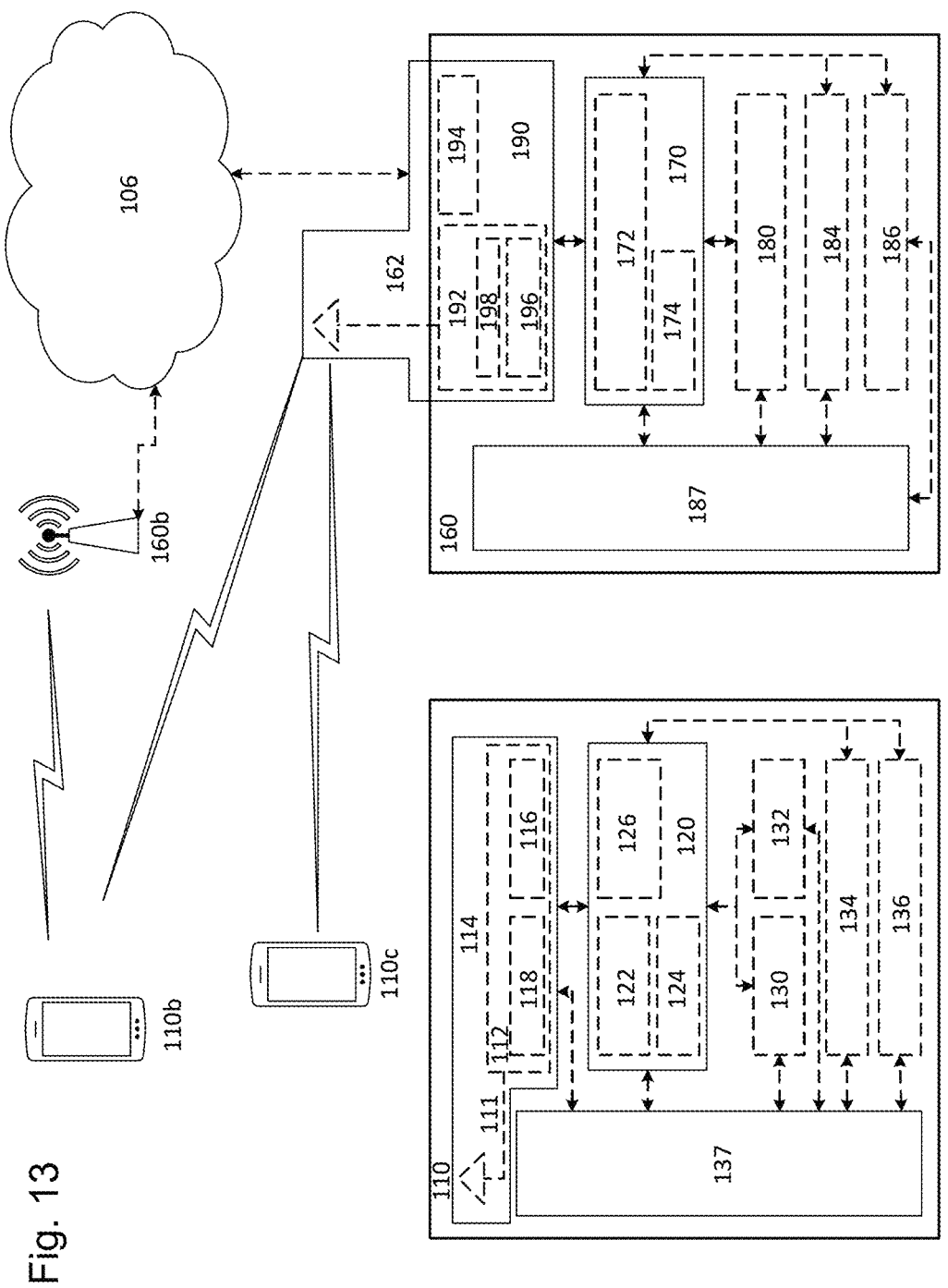
FIG. 13 is a block diagram illustrating an example wireless network.

FIG. 13 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 160 includes processing circuitry 170, device readable medium 180, interface 190, auxiliary equipment 184, power source 186, power circuitry 187, and antenna 162. Although network node 160 illustrated in the example wireless network of FIG. 13 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein.

In some embodiments, processing circuitry 170 may include a system on a chip (SOC). In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 13 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IOT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IOT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 14:
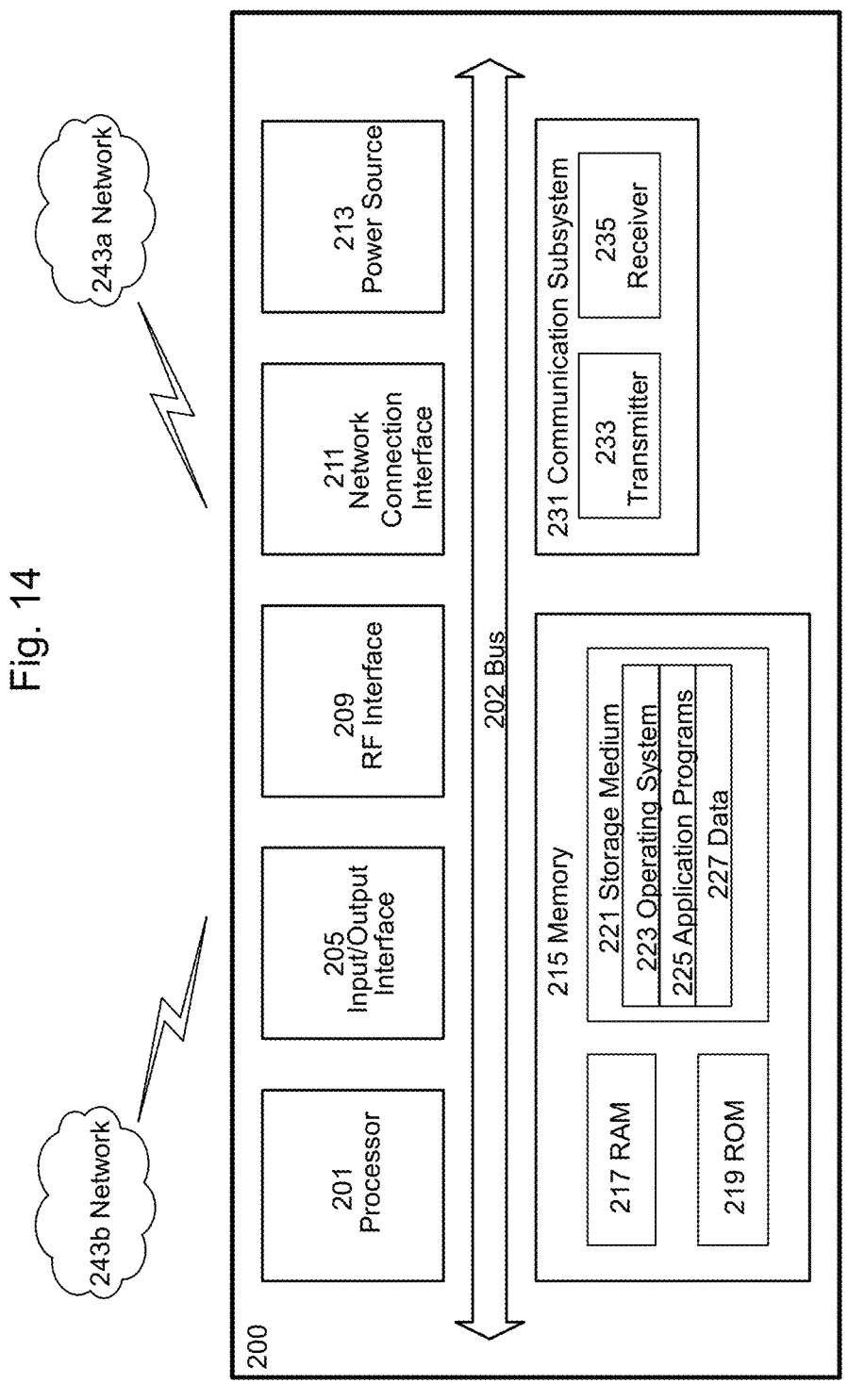
FIG. 14 illustrates an example user equipment, according to certain embodiments.

FIG. 14 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IOT UE, a machine type communication (MTC) UE, and/or an enhanced MTC (eMTC) UE. UE 200, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 14, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 15:
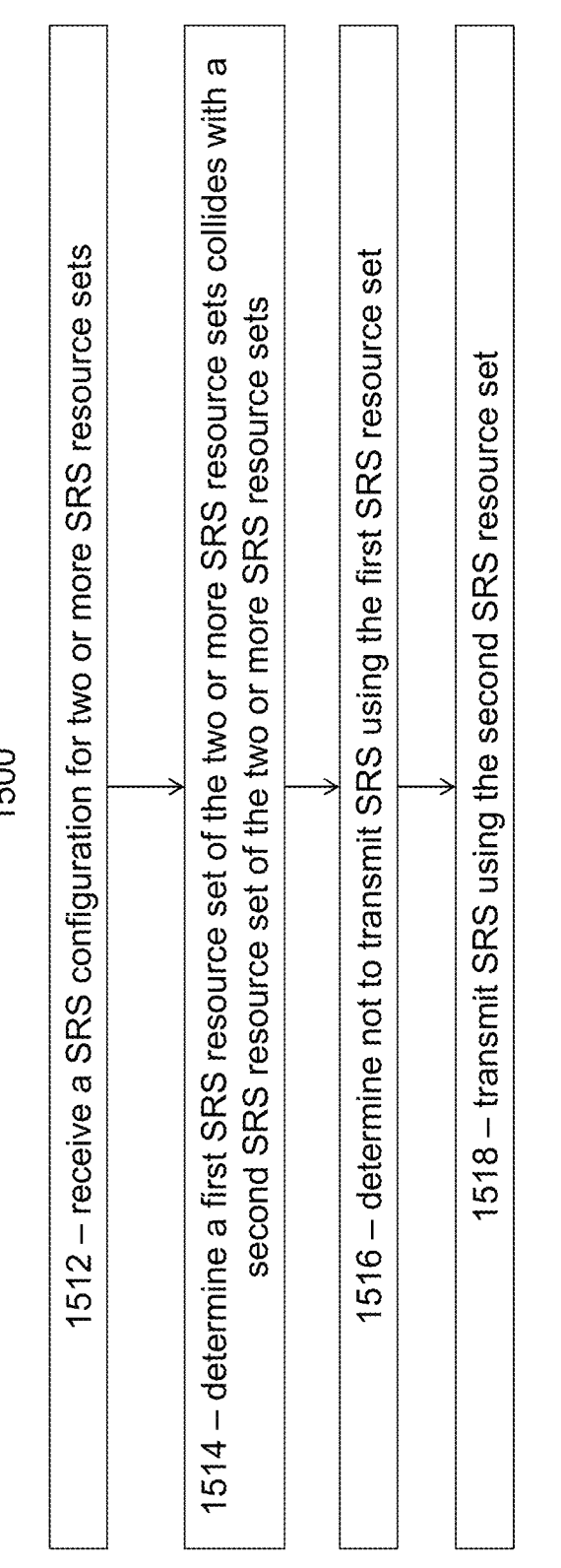
FIG. 15 is flowchart illustrating an example method in a wireless device, according to certain embodiments.

FIG. 15 is a flowchart illustrating an example method in a wireless device, according to certain embodiments. In particular embodiments, one or more steps of FIG. 15 may be performed by wireless device 110 described with respect to FIG. 13.

The method begins at step 1512, where the wireless device (e.g., wireless device 110) receives a SRS configuration for two or more SRS resource sets. For example, the wireless device may receive RRC configuration according to any of the examples described above.

At step 1514, the wireless device determines a first SRS resource set of the two or more SRS resource sets collides with a second SRS resource set of the two or more SRS resource sets. An example of a collision is illustrated in FIG. 7. The wireless device may be configured with one or more colliding resource sets, or the wireless device may be configured with one or more resource sets that initially do not collide, but after an event, such as a slot format reconfiguration, the one ore more resources sets may become colliding resource sets. The wireless device may determine one or more resource sets collide according to any of the embodiments and examples described herein.

At step 1516, the wireless device determines not to transmit SRS using the first SRS resource set. For example, the wireless device may prioritize the first and second SRS resource sets to determine which SRS resource set to transmit and which SRS resource set not to transmit (i.e., drop).

In particular embodiments, determining not to transmit SRS using the first SRS resource set is based on resource set identifiers associated with the first and second SRS resource sets (e.g., the first group of embodiments described above). For example, the method may comprise determining not to transmit SRS using the first SRS resource set when a resource set identifier associated with the first SRS resource set is larger (or smaller) than a resource set identifier associated with the second SRS resource set.

In particular embodiments, determining not to transmit SRS using the first SRS resource set is based on an amount of SRS resources associated with the first and second SRS resource sets (e.g., the second group of embodiments described above). For example, determining not to transmit SRS using the first SRS resource set may comprise determining the first resource set has fewer SRS resources than the second SRS resource set.

In particular embodiments, determining not to transmit SRS using the first SRS resource set is based on usage types associated with the first and second SRS resource sets (e.g., the third group of embodiments described above). The usage types may be prioritized from highest to lowest as follows: 'antennaSwitching', 'codebook', 'nonCodebook', and 'beamManagement'.

In particular embodiments, determining not to transmit SRS using the first SRS resource set comprises determining not to transmit a portion of the first SRS resource set that overlaps with the second SRS resource set and transmitting SRS using a non-overlapping portion of the first SRS resource set (e.g., the fourth group of embodiments described above).

Particular embodiments may use any combination of one or more of the determination criteria described above.

At step 1518, the wireless device transmits SRS using the second SRS resource set. When more than one pair of SRS resource sets collide, the previous steps may be repeated as needed to resolve all collisions.

Modifications, additions, or omissions may be made to method 1500 of FIG. 15. Additionally, one or more steps in the method of FIG. 15 may be performed in parallel or in any suitable order.

Figure 16:
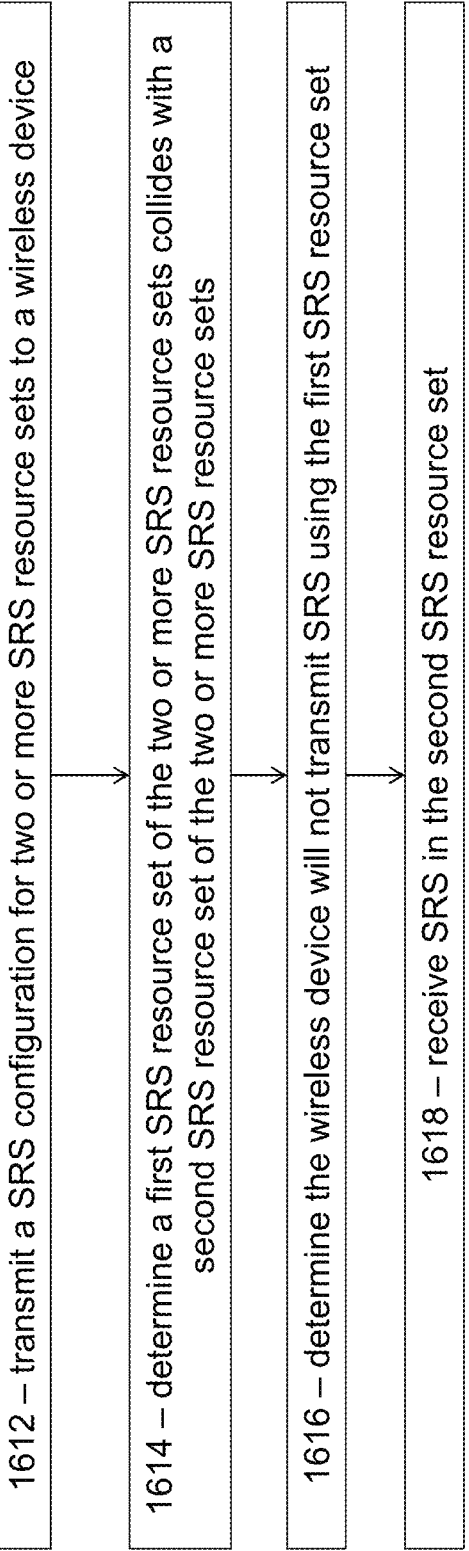
FIG. 16 is a flowchart illustrating an example method in a network node, according to certain embodiments.

FIG. 16 is a flowchart illustrating an example method in a network node, according to certain embodiments. In particular embodiments, one or more steps of FIG. 16 may be performed by network node 160 described with respect to FIG. 13.

The method begins at step 1612, where the network node (e.g., network node 160) transmits a SRS configuration for two or more SRS resource sets to a wireless device. For example, the network node may transmit RRC configuration according to any of the examples described above.

At step 1614, the network node determines a first SRS resource set of the two or more SRS resource sets collides with a second SRS resource set of the two or more SRS resource sets. Determination procedures are described above with respect to step 1514 of FIG. 15.

At step 1616, the network node determines the wireless device will not transmit SRS using the first SRS resource set. Determination procedures are described above with respect to step 1516 of FIG. 15.

At step 1618, the network node receives SRS in the second SRS resource set. The network node knows to expect SRS in the second SRS resource set based on the determination step 1616.

Modifications, additions, or omissions may be made to method 1600 of FIG. 16. Additionally, one or more steps in the method of FIG. 16 may be performed in parallel or in any suitable order.

Figure 17:
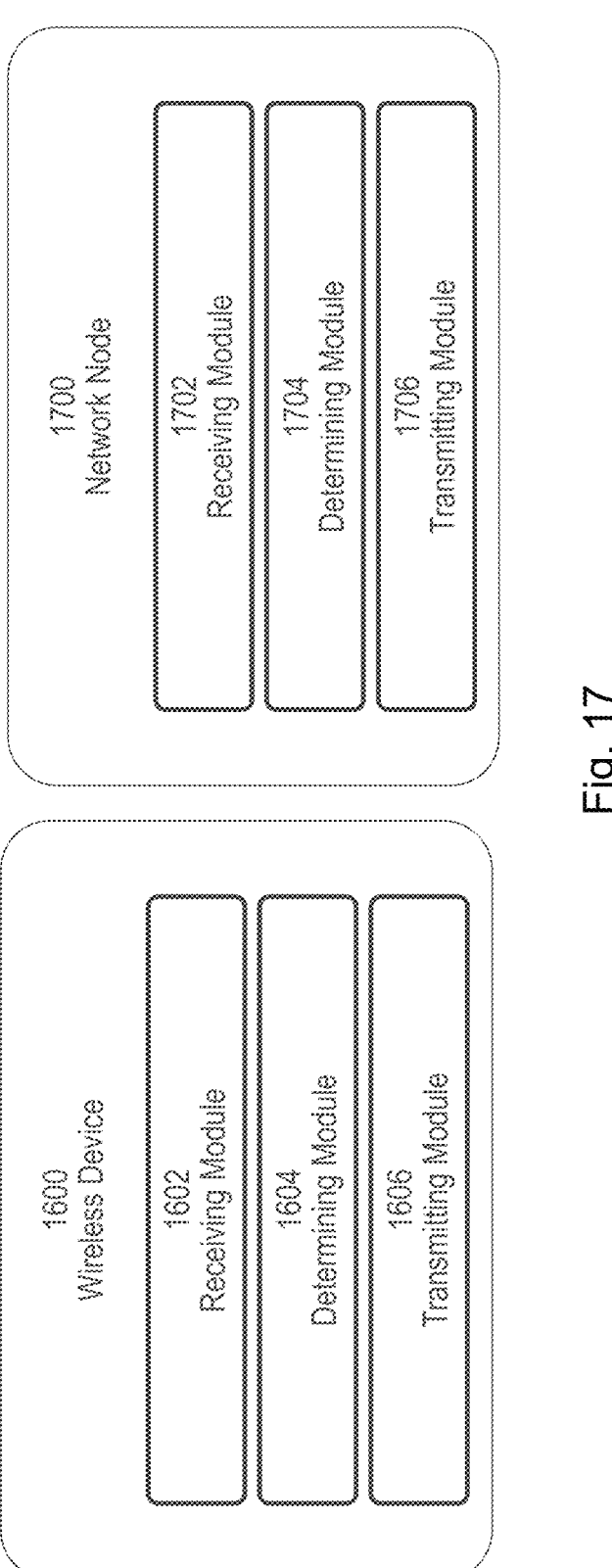
FIG. 17 illustrates a schematic block diagram of a network node and a wireless device in a wireless network, according to certain embodiments.

FIG. 17 illustrates a schematic block diagram of two apparatuses in a wireless network (for example, the wireless network illustrated in FIG. 13). The apparatuses may comprise a network node and a wireless device (e.g., wireless device 110 and network node 160 in FIG. 13). Apparatuses 1600 and 1700 are operable to carry out the example methods described with reference to FIGS. 15 and 16, respectively. Apparatuses 1600 and 1700 may be operable to carry out other processes or methods disclosed herein. It is also to be understood that the methods of FIGS. 15 and 16 are not necessarily carried out solely by apparatuses 1600 and 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. In some implementations, the processing circuitry may be used to cause receiving module 1702, determining module 1704, transmitting module 1706, and any other suitable units of apparatus 1700 to perform corresponding functions according one or more embodiments of the present disclosure.

As illustrated in FIG. 17, apparatus 1600 includes receiving module 1602 configured to receive SRS configuration information according to any of the embodiments and examples described herein. Determining module 1604 is configured to determine SRS resource sets collide and select SRS resource sets for transmission according to any of the embodiments and examples described herein. Transmitting module 1606 is configured to transmit SRS according to any of the embodiments and examples described herein.

As illustrated in FIG. 17, apparatus 1700 includes receiving module 1702 configured to receive SRS transmissions according to any of the embodiments and examples described herein. Determining module 1704 is configured to determine SRS resource sets collide and select SRS resource sets for reception according to any of the embodiments and examples described herein. Transmitting module 1706 is configured to transmit SRS configuration information to a wireless device according to any of the embodiments and examples described herein.

Figure 18:
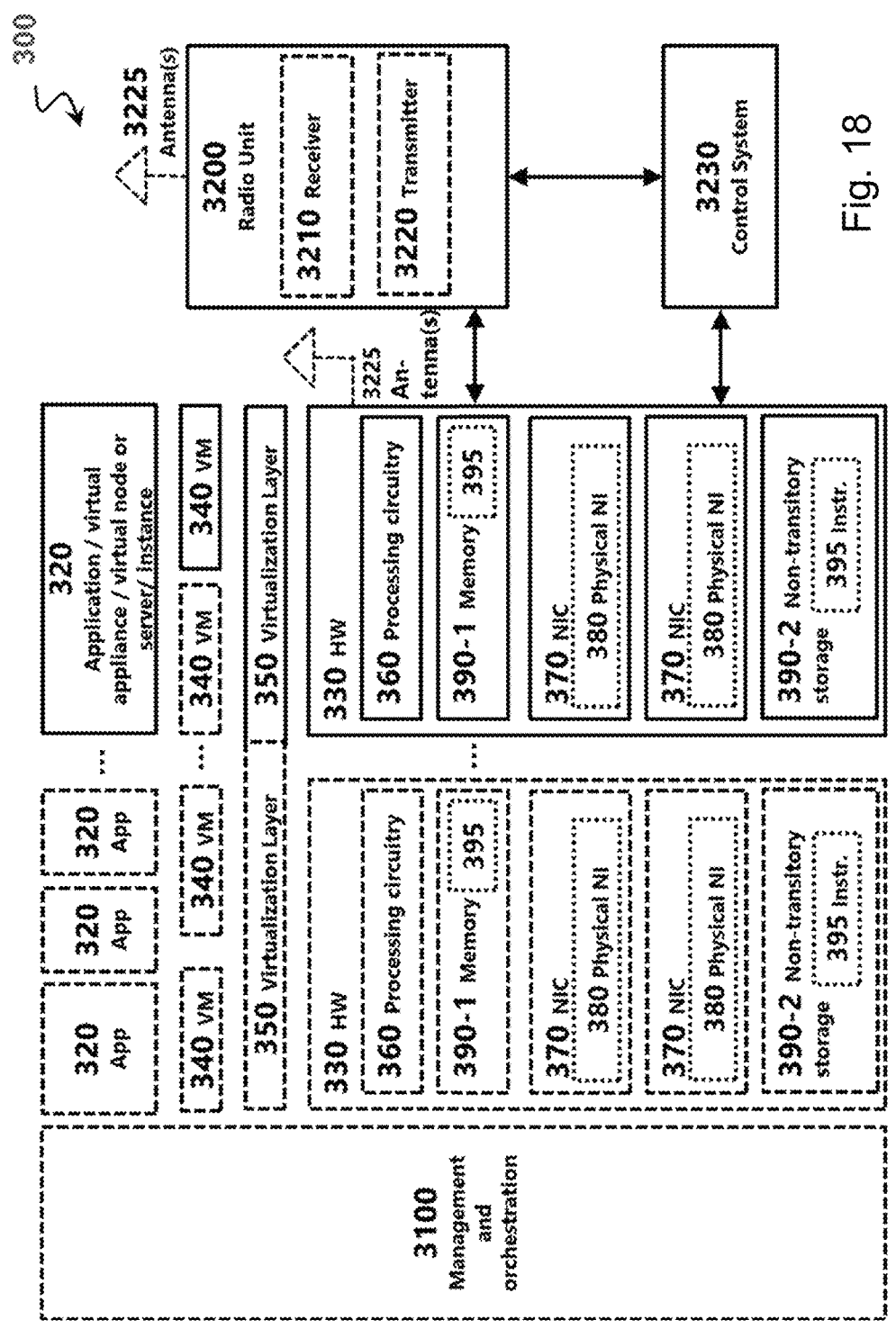
FIG. 18 illustrates an example virtualization environment, according to certain embodiments.

FIG. 18 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 18, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV. Virtual Network Function (VNF) is responsible for handling specific network functions that run in one or more virtual machines 340 on top of hardware networking infrastructure 330 and corresponds to application 320 in FIG. 13.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 19:
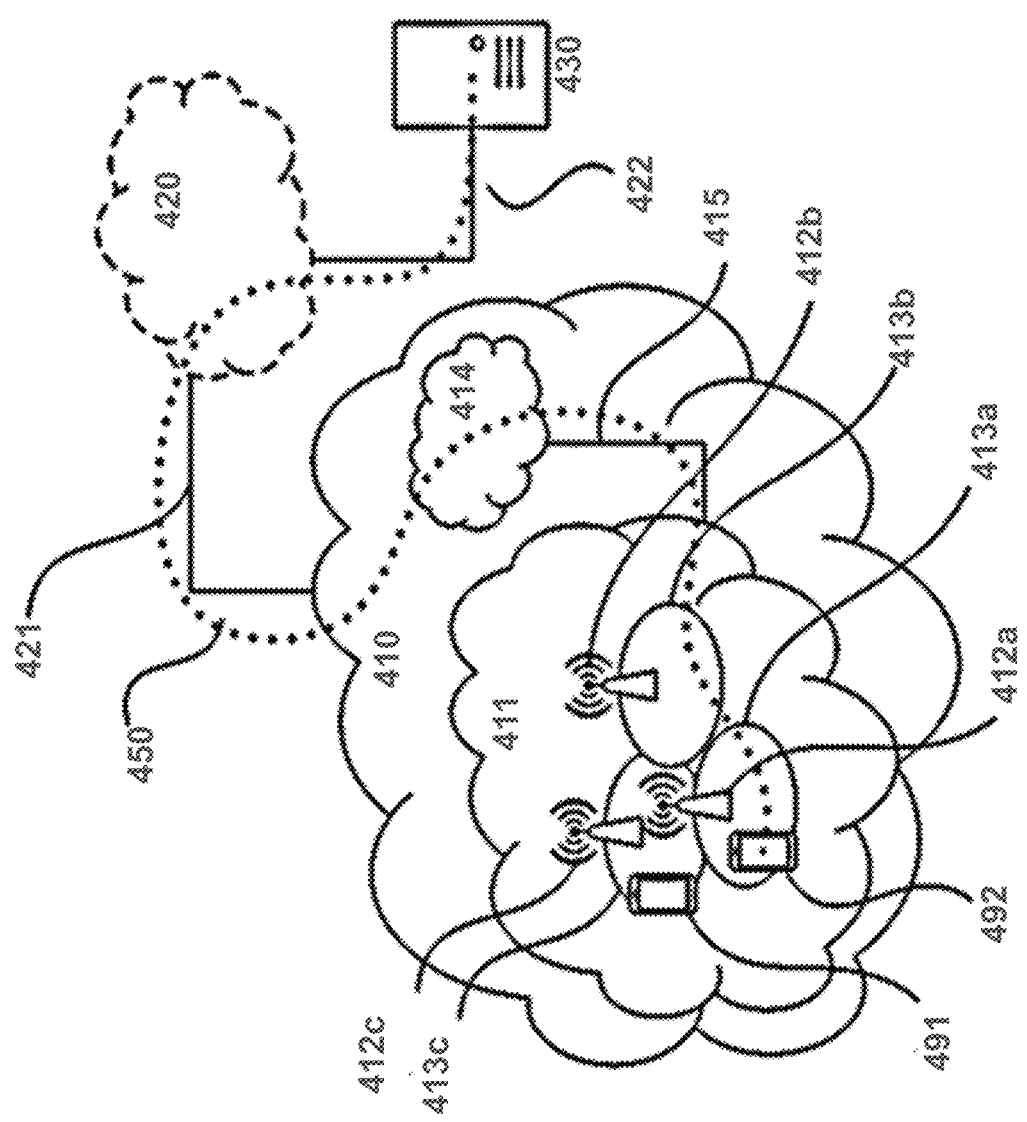
FIG. 19 illustrates an example telecommunication network connected via an intermediate network to a host computer, according to certain embodiments.

With reference to FIG. 19, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a. 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 19 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 20:
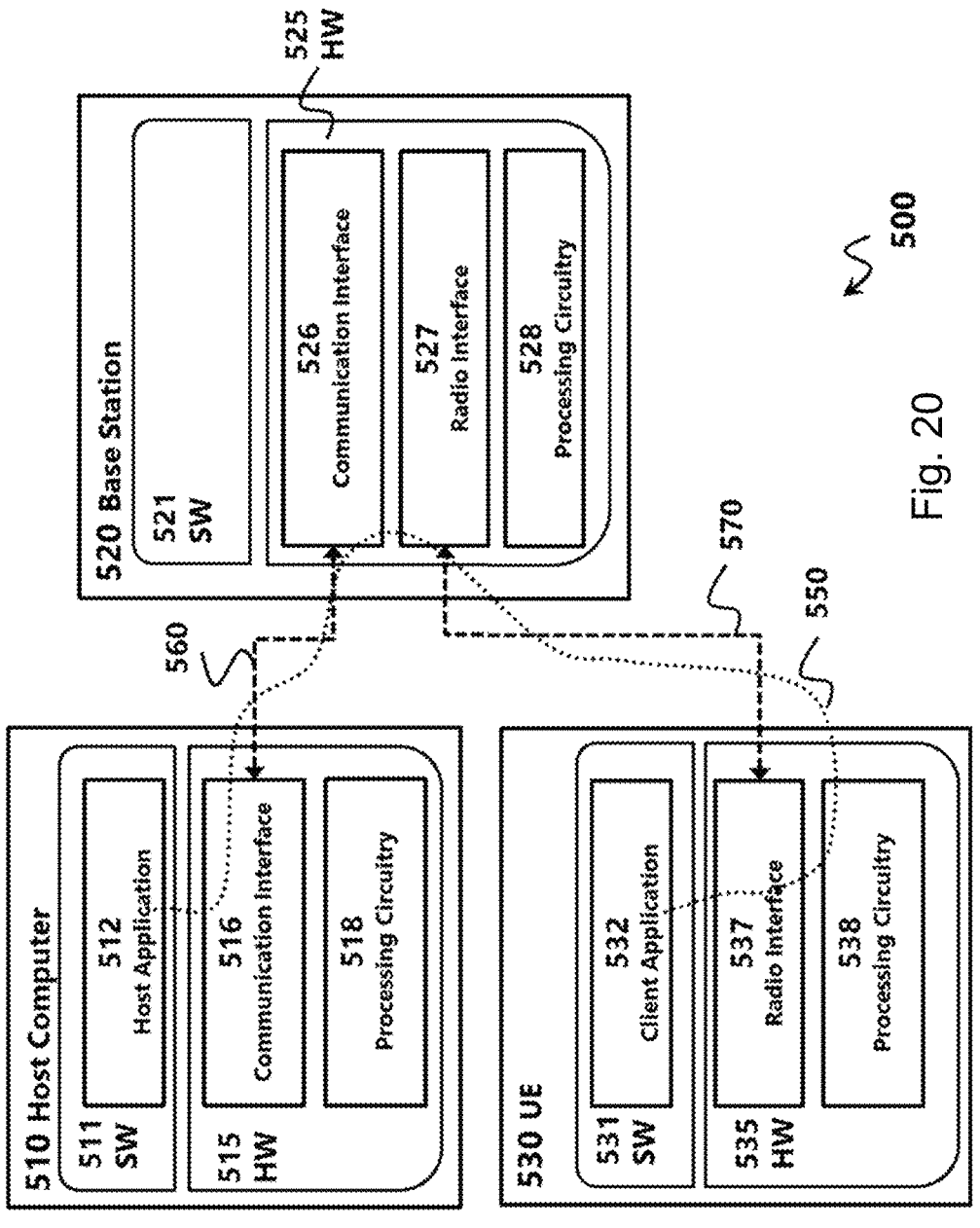
FIG. 20 illustrates an example host computer communicating via a base station with a user equipment over a partially wireless connection, according to certain embodiments.

FIG. 20 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 20. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 20) served by base station 520. Communication interface 526 may be configured to facilitate connection 560 to host computer 510. Connection 560 may be direct, or it may pass through a core network (not shown in FIG. 20) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 20 may be similar or identical to host computer 430, one of base stations 412*a*, 412*b*, 412*c* and one of UEs 491, 492 of FIG. 19, respectively. This is to say, the inner workings of these entities may be as shown in FIG. 20 and independently, the surrounding network topology may be that of FIG. 19.

In FIG. 20, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 21:
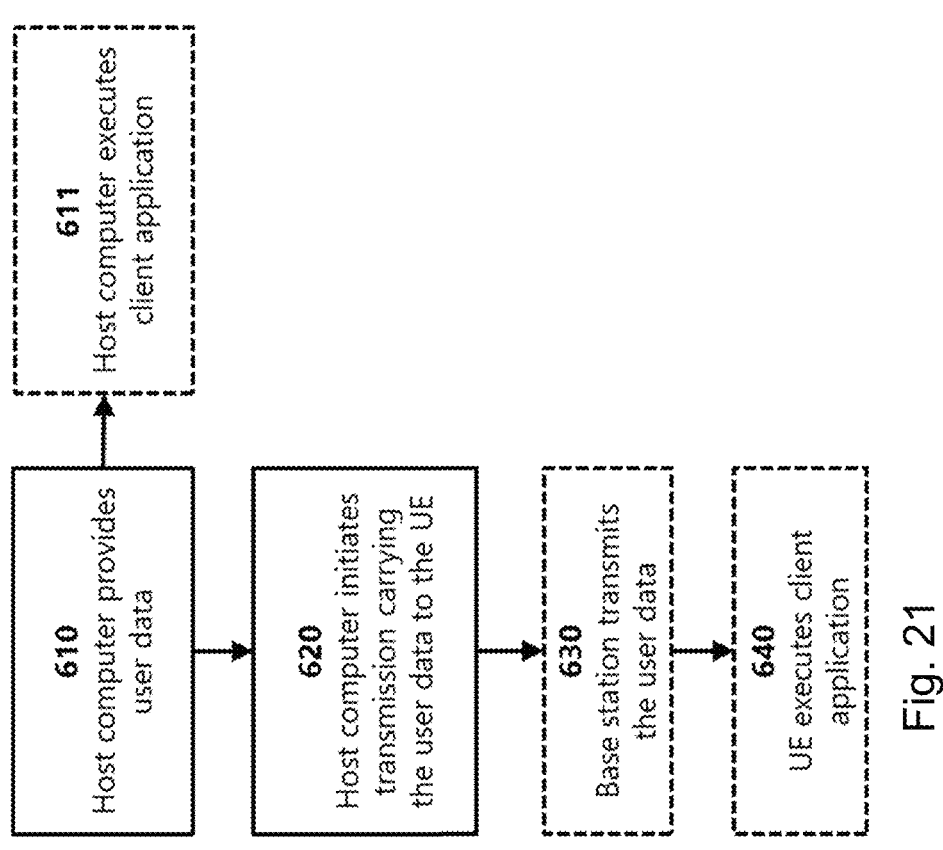
FIG. 21 is a flowchart illustrating a method implemented, according to certain embodiments.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 22:
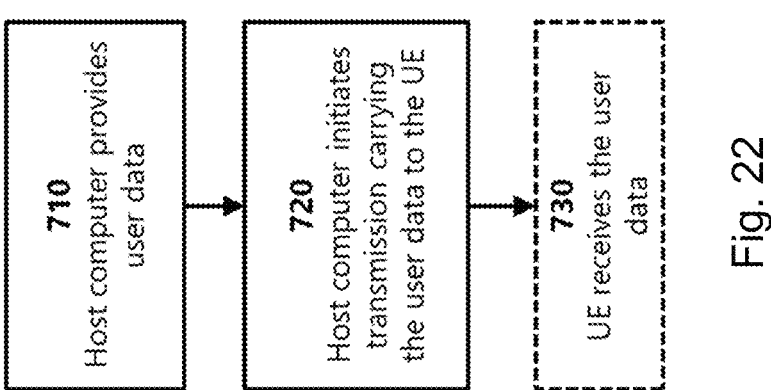
FIG. 22 is a flowchart illustrating a method implemented in a communication system, according to certain embodiments.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device for transmitting a sounding reference signal (SRS), the method comprising:

receiving a SRS configuration for two or more SRS resource sets;

determining a first SRS resource set of the two or more SRS resource sets collides with a second SRS resource set of the two or more SRS resource sets;

determining not to transmit SRS using the first SRS resource set; and transmitting SRS using the second SRS resource set, wherein determining not to transmit SRS using the first SRS resource set comprises determining the first resource set has fewer SRS resources than the second SRS resource set.

2. The method of claim 1, wherein determining not to transmit SRS using the first SRS resource set is based on resource set identifiers associated with the first and second SRS resource sets.

3. The method of claim 2, comprising determining not to transmit SRS using the first SRS resource set when a resource set identifier associated with the first SRS resource set is larger than a resource set identifier associated with the second SRS resource set.

4. The method of claim 1, wherein determining not to transmit SRS using the first SRS resource set is based on usage types associated with the first and second SRS resource sets.

5. The method of claim 4, wherein the usage types are prioritized from highest to lowest as follows: 'antennaSwitching', 'codebook', 'nonCodebook', and 'beamManagement'.

6. The method of claim 1, wherein determining not to transmit SRS using the first SRS resource set comprises determining not to transmit a portion of the first SRS resource set that overlaps with the second SRS resource set and transmitting SRS using a non-overlapping portion of the first SRS resource set.

7. The method of claim 1, wherein determining the first SRS resource set of the two or more SRS resource sets collides with a second SRS resource set of the two or more SRS resource sets comprises determining a slot format has changed.

8. A wireless device capable of transmitting a sounding reference signal (SRS), the wireless device comprising processing circuitry configured to:

receive a SRS configuration for two or more SRS resource sets;

determine a first SRS resource set of the two or more SRS resource sets collides with a second SRS resource set of the two or more SRS resource sets;

determine not to transmit SRS using the first SRS resource set; and transmit SRS using the second SRS resource set, wherein determining not to transmit SRS using the first SRS resource set comprises determining the first resource set has fewer SRS resources than the second SRS resource set.

9. The wireless device of claim 8, wherein the processing circuitry is configured to determine not to transmit SRS using the first SRS resource set based on resource set identifiers associated with the first and second SRS resource sets.

10. The wireless device of claim 9, wherein the processing circuitry is configured to determine not to transmit SRS using the first SRS resource set when a resource set identifier associated with the first SRS resource set is larger than a resource set identifier associated with the second SRS resource set.

11. The wireless device of claim 8, wherein the processing circuitry is configured to determine not to transmit SRS using the first SRS resource set based on usage types associated with the first and second SRS resource sets.

12. The wireless device of claim 11, wherein the usage types are prioritized from highest to lowest as follows: 'antennaSwitching', 'codebook', 'nonCodebook', and 'beamManagement'.

13. The wireless device of claim 8, wherein the processing circuitry is configured to determine not to transmit SRS using the first SRS resource set by determining not to transmit a portion of the first SRS resource set that overlaps with the second SRS resource set and transmitting SRS using a non-overlapping portion of the first SRS resource set.

14. The wireless device of claim 8, wherein the processing circuitry is configured to determine the first SRS resource set of the two or more SRS resource sets collides with a second SRS resource set of the two or more SRS resource sets by determining a slot format has changed.

15. A method performed by a network node for receiving a sounding reference signal (SRS), the method comprising:

transmitting a SRS configuration for two or more SRS resource sets to a wireless device;

determining a first SRS resource set of the two or more SRS resource sets collides with a second SRS resource set of the two or more SRS resource sets;

determining the wireless device will not transmit SRS using the first SRS resource set; and receiving SRS in the second SRS resource set, wherein determining not to transmit SRS using the first SRS resource set comprises determining the first resource set has fewer SRS resources than the second SRS resource set.

16. The method of claim 15, wherein determining the wireless device will not transmit SRS using the first SRS resource set is based on resource set identifiers associated with the first and second SRS resource sets.

17. A network node operable to receive a sounding reference signal (SRS), the network node comprising processing circuitry configured to:

transmit a SRS configuration for two or more SRS resource sets to a wireless device;

determine a first SRS resource set of the two or more SRS resource sets collides with a second SRS resource set of the two or more SRS resource sets;

determine the wireless device will not transmit SRS using the first SRS resource set; and receive SRS in the second SRS resource set, wherein determining not to transmit SRS using the first SRS resource set comprises determining the first resource set has fewer SRS resources than the second SRS resource set.

18. The network node of claim 17, wherein the processing circuitry is configured to determine the wireless device will not transmit SRS using the first SRS resource set based on resource set identifiers associated with the first and second SRS resource sets.

19. The network node of claim 18, wherein the processing circuitry is configured to determine the wireless device will not transmit SRS using the first SRS resource set when a resource set identifier associated with the first SRS resource set is larger than a resource set identifier associated with the second SRS resource set.

20. The network node of claim 17, wherein the processing circuitry is configured to determine the wireless device will not transmit SRS using the first SRS resource set based on usage types associated with the first and second SRS resource sets.

21. The network node of claim 20, wherein the usage types are prioritized from highest to lowest as follows: 'antennaSwitching', 'codebook', 'nonCodebook', and 'beamManagement'.

22. The network node of claim 17, wherein the processing circuitry is configured to determine the wireless device will not transmit SRS using the first SRS resource set by determining the wireless device will not transmit a portion of the first SRS resource set that overlaps with the second SRS resource set and the wireless device will transmit SRS using a non-overlapping portion of the first SRS resource set.

23. The network node of claim 17, wherein the processing circuitry is configured to determine the first SRS resource set of the two or more SRS resource sets collides with a second SRS resource set of the two or more SRS resource sets by determining a slot format has changed.

* * * * *